United States Patent
Kuri et al.

(10) Patent No.: US 9,547,166 B2
(45) Date of Patent: Jan. 17, 2017

(54) ACTUATOR CONTROL DEVICE, OPTICAL MODULE, AND ELECTRONIC APPARATUS

(71) Applicant: Seiko Epson Corporation, Tokyo (JP)

(72) Inventors: Ryohei Kuri, Fujimi (JP); Teruyuki Nishimura, Matsumoto (JP)

(73) Assignee: Seiko Epson Corporation (JP)

( * ) Notice: Subject to any disclaimer, the term of this patent is extended or adjusted under 35 U.S.C. 154(b) by 45 days.

(21) Appl. No.: 14/605,089

(22) Filed: Jan. 26, 2015

(65) Prior Publication Data
US 2015/0212314 A1    Jul. 30, 2015

(30) Foreign Application Priority Data
Jan. 27, 2014 (JP) ................................. 2014-012123

(51) Int. Cl.
G02B 5/28 (2006.01)
G02B 26/00 (2006.01)
H02N 1/00 (2006.01)
G02B 5/00 (2006.01)

(52) U.S. Cl.
CPC ............... G02B 26/001 (2013.01); G02B 5/00 (2013.01); G02B 5/28 (2013.01); G02B 5/284 (2013.01); G02B 5/285 (2013.01); G02B 26/00 (2013.01); H02N 1/006 (2013.01)

(58) Field of Classification Search
CPC ......... G02B 26/001; G02B 26/00; G02B 5/00; G02B 5/001; G02B 5/28; G02B 5/284; G02B 5/285; G02B 5/286; G02B 5/288; G01J 3/45; H02N 1/006

USPC ........ 359/578, 577, 584, 589; 356/450, 451, 356/452; 345/32
See application file for complete search history.

(56) References Cited

U.S. PATENT DOCUMENTS

| 2008/0055693 | A1 | 3/2008 | Yun | |
|---|---|---|---|---|
| 2009/0201282 | A1 | 8/2009 | Govil | |
| 2011/0254497 | A1* | 10/2011 | Matsumoto | F03G 7/005 318/599 |
| 2013/0070247 | A1* | 3/2013 | Funamoto | G01J 3/26 356/416 |
| 2013/0107262 | A1* | 5/2013 | Nishimura | G01J 3/42 356/416 |
| 2013/0114083 | A1* | 5/2013 | Sano | G02B 26/001 356/416 |

(Continued)

FOREIGN PATENT DOCUMENTS

JP 01-094312 A 4/1989
JP 2002-277758 A 9/2002
(Continued)

Primary Examiner — William R Alexander
(74) Attorney, Agent, or Firm — Harness, Dickey & Pierce, P.L.C.

(57) ABSTRACT

A spectroscopic measurement apparatus includes an actuator that is driven by applying a drive voltage, a gap detector that detects a dimension of a gap, and a voltage control section including a feedback loop that controls the drive voltage depending on a detection result of the gap detector. The voltage control section includes a comparator that outputs a voltage signal at a High level $V_H$ if an absolute value of a deviation between a drive amount of the actuator and a setting value of the drive amount exceeds a predetermined threshold based on the detection result after a predetermined time elapses from the start of driving of the actuator.

15 Claims, 12 Drawing Sheets

(56) References Cited

U.S. PATENT DOCUMENTS

2013/0308134 A1* 11/2013 Hirokubo ................ G02B 5/28
                                                        356/451

FOREIGN PATENT DOCUMENTS

| JP | 2008-058969 A | 3/2008 |
| JP | 2011-514550 A | 5/2011 |

* cited by examiner

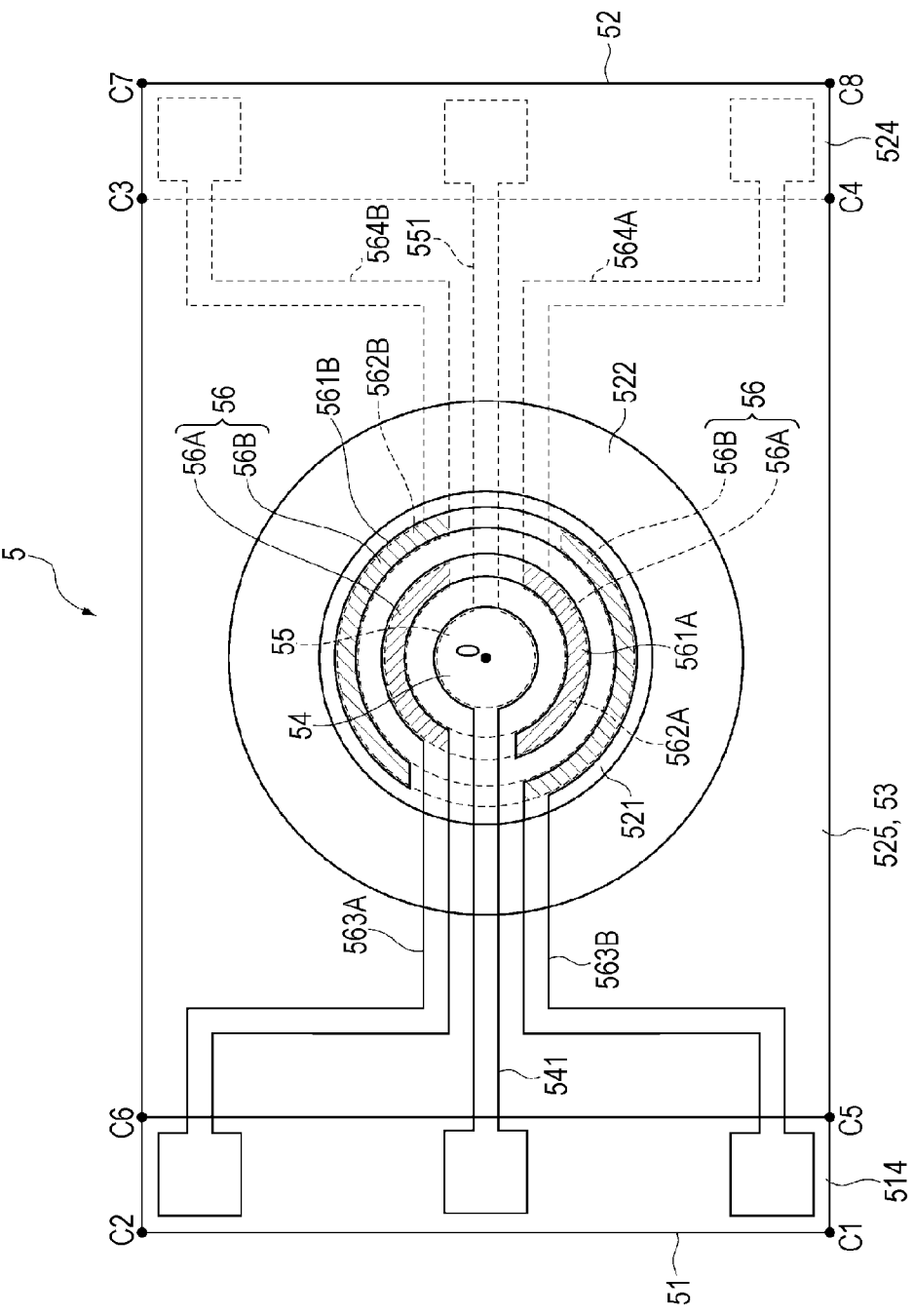

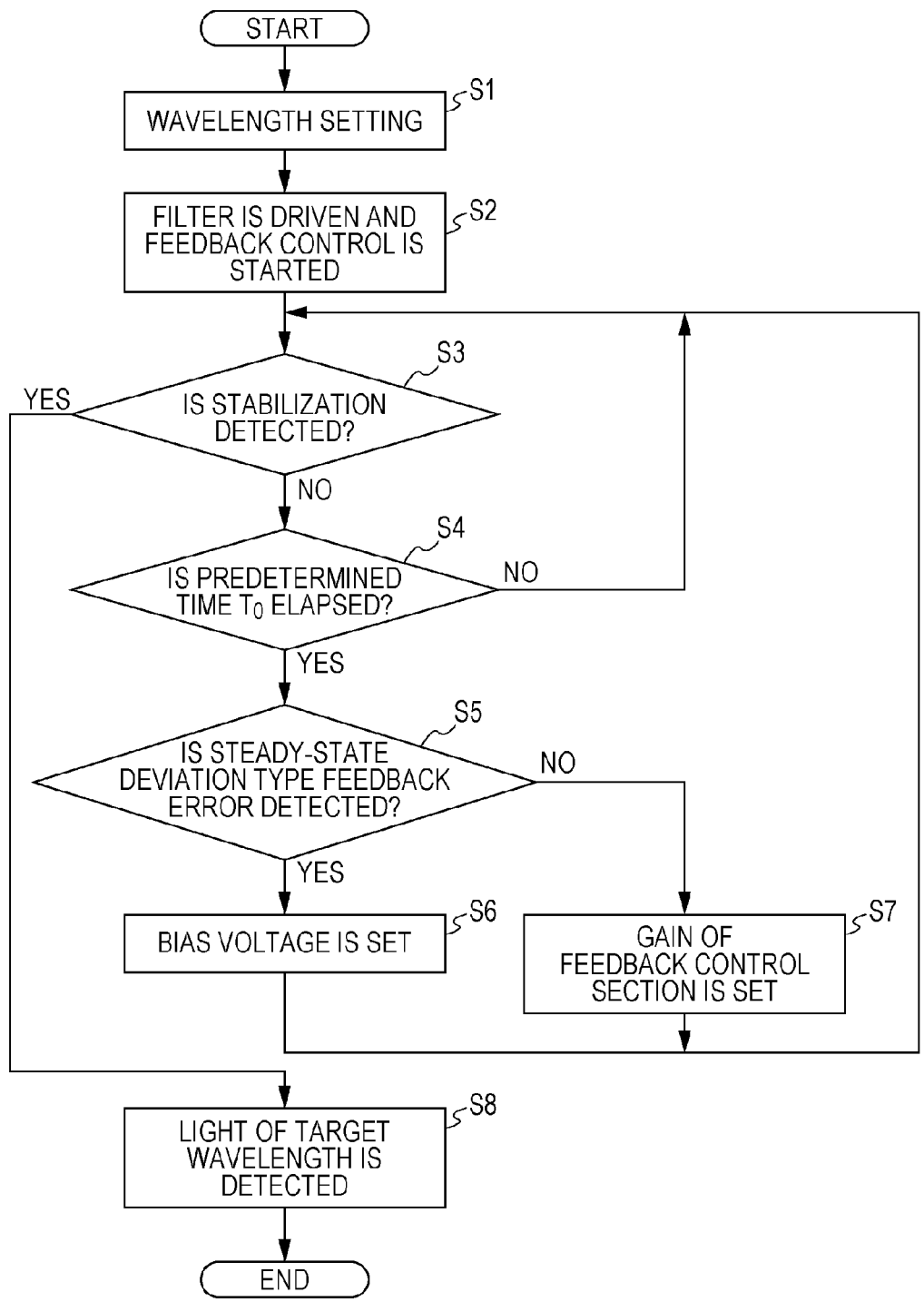

ACTUATOR CONTROL DEVICE, OPTICAL MODULE, AND ELECTRONIC APPARATUS

BACKGROUND

1. Technical Field

The present invention relates to an actuator control device, an optical module, and an electronic apparatus.

2. Related Art

A variable wavelength interference filter is known that includes a pair of substrates facing each other, reflective films respectively disposed on each substrate and facing each other, and electrodes respectively disposed on each substrate and facing each other (for example, JP-A-1-94312).

In the variable wavelength interference filter described in JP-A-1-94312, electrostatic capacitance monitor electrodes facing each other and electrostatic force applying electrodes (electrostatic actuator) facing each other are respectively disposed on each substrate. In such a variable wavelength interference filter, a voltage is applied to the electrostatic actuator by a control circuit and thereby a gap amount (interval dimension) between the reflective films is changed. In addition, a potential of the electrostatic capacitance monitor electrode is detected by an electrostatic capacitance detection circuit and the voltage applied from the control circuit to the electrostatic actuator is finely adjusted (feedback control). As a result, the dimension (gap amount) of the gap between the reflective films can be set to a desired target value.

However, the electrostatic actuator described in JP-A-1-94312 does not include a configuration to confirm whether the gap amount corresponding to an electrostatic capacitance value is equal to a target value of the gap amount and whether the feedback control is normally (correctly) performed when performing the feedback control. Thus, even if the feedback control is abnormally performed and an error occurs, the error cannot be detected.

SUMMARY

An advantage of some aspects of the invention is to provide an actuator control device capable of detecting an error of feedback control, an optical module, and an electronic apparatus.

An actuator control device includes: an actuator that is driven by applying a drive voltage; a detection unit that detects a drive amount of the actuator; and a voltage control section (e.g., a feedback loop) that controls the drive voltage applied to the actuator depending on a detection value of the drive amount detected by the detection unit and a setting value of the drive amount. The feedback loop includes a deviation detection unit that detects whether or not an absolute value of a deviation between the detection value and the setting value exceeds a predetermined threshold after elapse of a predetermined time from drive start of the actuator.

Here, in this case, the predetermined time from the drive start of the actuator is, for example, a sufficient time (hereinafter, referred to as a stabilization time) or more in which the drive amount is stabilized to a value corresponding to the drive voltage after the drive voltage corresponding to the setting value is applied to the actuator and the actuator is driven. Moreover, in this case, the drive start of the actuator also includes timing in which the drive voltage applied to the actuator is changed by varying the setting value in addition to timing in which the drive voltage is applied to the actuator based on the setting value after a state (drive voltage is 0 V) where the actuator is not driven.

Furthermore, the threshold in this case is a value corresponding to a threshold of an allowable range of a drive error of the actuator and is appropriately set depending on drive accuracy and the like of a required actuator.

In this case, the feedback loop applies the drive voltage to the actuator based on the detection value detected by the detection unit such that the detection value approaches the setting value. Then, the deviation detection unit detects whether or not a difference between the detection value of the drive amount by the detection unit and the setting value exceeds a predetermined threshold after elapse of a predetermined time from drive of the actuator.

That is, it is detected whether or not the absolute value of the deviation between the detection value of the drive amount and the setting value is within an allowable error range while the drive of the actuator is stabilized. Thus, it is possible to detect that the feedback control is not appropriately performed, a practical drive amount is stabilized at a value that exceeds a predetermined threshold with respect to the setting value of the drive amount, or vibration continues without stabilization of the drive amount. It is possible to detect the error of the feedback control.

It is preferable that the actuator control device may further include a parameter correction unit that corrects a drive parameter of the actuator in the feedback loop if it is determined that the absolute value of the deviation exceeds the threshold by the deviation detection unit.

In this case, as described above, when detecting the error of the feedback control, the drive parameter of the actuator is corrected. Thus, it is possible to control the drive voltage depending on a detection result of the error of the feedback control such that the drive amount is the setting value.

In the actuator control device, it is preferable that the parameter correction unit decreases a gain in the feedback loop if the deviation of which the absolute value is the threshold or less and the deviation of which the absolute value exceeds the threshold are alternately detected several times by the deviation detection unit after elapse of a predetermined time.

Here, in the feedback control, in order to stabilize the actuator within the stabilization time, it is preferable that the value of the gain be an appropriate value. If the value of the gain is greater than the appropriate value, drive amount variation of the actuator oscillates without converging or a time until the vibration is continued and the variation is converged is excessively long.

In contrast, in this case, when the absolute value of the deviation exceeding the threshold and the absolute value of the deviation less than the threshold are alternately detected several times after elapse of a predetermined time from drive start, that is, if the actuator is oscillated, the gain of the feedback control is decreased. Thus, it is possible to control the drive voltage so as to converge the drive amount.

It is preferable that the actuator include a first actuator and a second actuator capable of being driven independently each other, in which the feedback loop include a bias voltage applying unit that applies a predetermined bias voltage to the first actuator and a controller that controls the drive voltage applied to the second actuator based on the drive amount detected by the detection unit and a target value of the drive amount of the actuator, and in which the parameter correction unit change the bias voltage in the bias voltage applying unit if the deviation of which the absolute value is the threshold or greater continuously detected by the deviation detection unit after elapse of a predetermined time.

In this case, the actuator is configured of the first actuator and the second actuator, the bias voltage is applied to the first actuator, and a feedback voltage is applied to the second actuator. In such an actuator, the first actuator is in coarsely moving drive by applying of the bias voltage and the second actuator is in finely moving drive by the feedback voltage based on the drive amount detected by the detection unit, and thereby it is possible to control accurately the drive amount of the actuator.

Here, if the bias voltage is greater than or smaller than the appropriate value, a difference between the drive amount by the coarsely moving drive and the setting value may exceed a range capable of corresponding to an adjustment range of the finely moving drive by the second actuator. For example, for example, if the drive amount (that is, coarsely moving drive amount) by the coarsely moving drive exceeds a setting value (that is, setting drive amount) of an entire drive amount, the entire drive amount cannot be the setting value even if the drive amount (that is, finely moving drive amount) of the finely moving drive is 0. Furthermore, if an absolute value of the difference between the coarsely moving drive amount and the setting drive amount is greater than the maximum value of the finely moving drive amount and the coarsely moving drive amount is smaller than the setting drive amount, the entire drive amount cannot be the setting value even if the finely moving drive amount is the maximum value. In this case, even if the drive amount variation converges on the minimum value or the maximum value of the feedback voltage, the detection value converges on a value that is not allowed. In this case, as described above, it is possible to detect that the difference between the coarsely moving drive amount and setting value is in a state of exceeding an adjustable range of the finely moving drive and to adjust the bias voltage by applying the bias voltage. Thus, it is possible to converge the coarsely moving drive amount to the adjustable range of the finely moving drive and it is possible to reliably and accurately control the drive amount of the actuator.

An optical module includes: a pair of reflective films facing each other; an actuator that is driven by applying a drive voltage and changes a gap dimension between the pair of reflective films depending on a drive amount; a detection unit that detects the drive amount of the actuator; and a feedback loop that controls a drive voltage applied to the actuator depending on a detection value of the drive amount detected by the detection unit and a setting value of the drive amount. The feedback loop includes a deviation detection unit that detects whether or not an absolute value of a deviation between the detection value and the setting value exceeds a predetermined threshold after elapse of a predetermined time from drive start of the actuator.

In this case, similar to the actuator control device described above, it is detected whether or not the absolute value of the deviation between the detection value of the drive amount and the setting value is a value exceeding the threshold while the drive of the actuator is stabilized from drive start after elapse of a predetermined time, and it is detected whether or not the absolute value is within the allowable error range. Thus, it is possible to detect that the feedback control is not appropriately performed, a practical drive amount is stabilized at a value exceeding a predetermined threshold to the setting value of the drive amount, or vibration continues without stabilization of the drive amount. It is possible to detect the error of the feedback control.

An electronic apparatus includes: an actuator that is driven by applying a drive voltage; a detection unit that detects a drive amount of the actuator; a feedback loop that controls the drive voltage applied to the actuator depending on a detection value of the drive amount detected by the detection unit and a setting value of the drive amount; and a processing section that performs a predetermined process by drive of the actuator. The feedback loop includes a deviation detection unit that detects whether or not an absolute value of a deviation between the detection value and the setting value exceeds a predetermined threshold after elapse of a predetermined time from drive start of the actuator.

In this case, similar to the actuator control device described above, it is detected whether or not the absolute value of the deviation between the detection value of the drive amount and the setting value is a value exceeding the threshold while the drive of the actuator is stabilized from drive start after elapse of a predetermined time, and it is detected whether or not the absolute value is within the allowable error range. Thus, it is possible to detect that the feedback control is not appropriately performed, a practical drive amount is stabilized at a value exceeding a predetermined threshold to the setting value of the drive amount, or vibration continues without stabilization of the drive amount. It is possible to detect the error of the feedback control.

BRIEF DESCRIPTION OF THE DRAWINGS

Embodiments of the invention will be described with reference to the accompanying drawings, wherein like numbers reference like elements.

FIG. 3 is a plan view of a variable wavelength interference filter of the embodiment.

FIG. 4 is a flowchart illustrating a driving method of the variable wavelength interference filter.

DESCRIPTION OF EXEMPLARY EMBODIMENTS

Hereinafter, a spectroscopic measurement apparatus of an embodiment according to the invention will be described with reference to the drawings.

Configuration of Spectroscopic Measurement Apparatus

Figure 1:
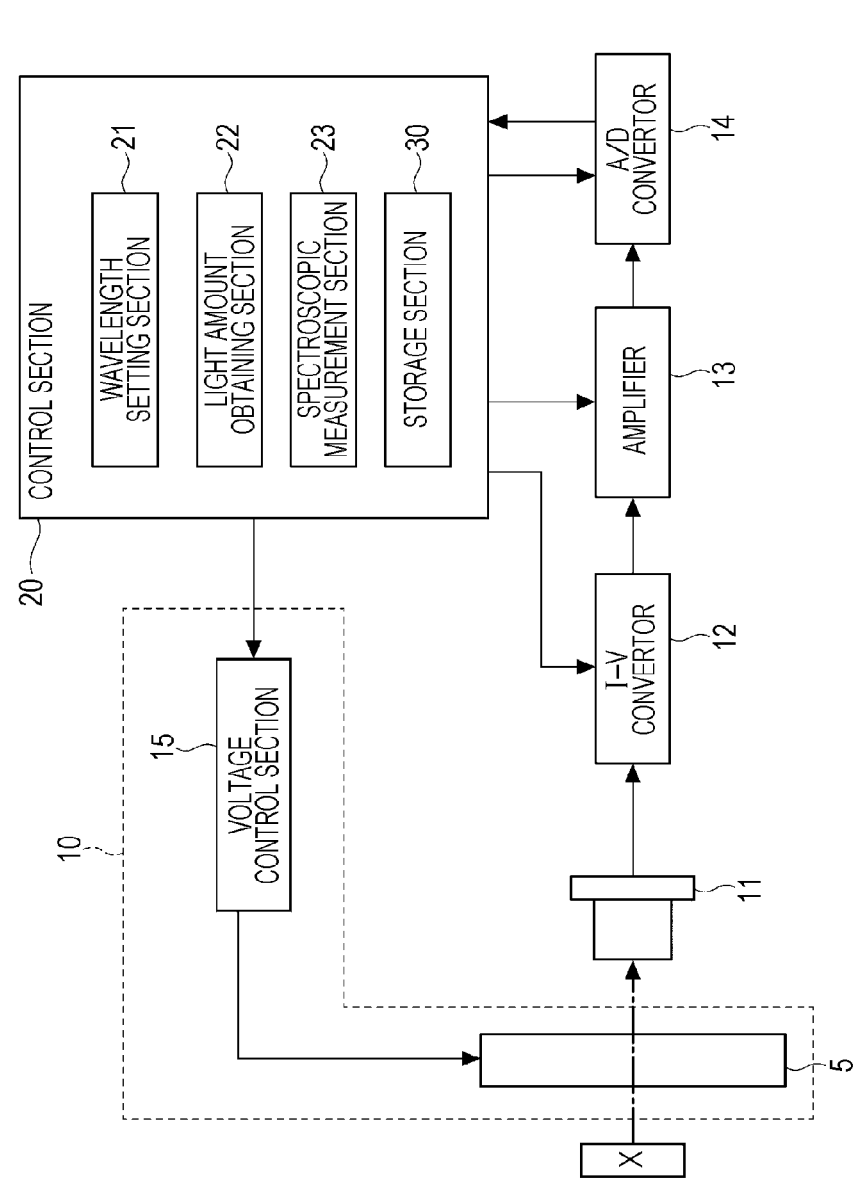
FIG. 1 is a block diagram illustrating a schematic configuration of a spectroscopic measurement apparatus of an embodiment according to the invention.

FIG. 1 is a block diagram illustrating a schematic configuration of a spectroscopic measurement apparatus of an embodiment according to the invention.

A spectroscopic measurement apparatus 1 is an electronic apparatus that analyzes light intensity of a predetermined wavelength in measurement object light reflected from a measurement object X and measures spectral spectrum. In the embodiment, an example in which the measurement object light reflected from the measurement object X is measured is described, but instead of the measurement object X, for example, if a light emitter such as a liquid crystal panel is used, the light emitted from the light emitter may be used as the measurement object light.

As illustrated in FIG. 1, the spectroscopic measurement apparatus 1 includes an optical module 10, a detector 11 (detection section), an I-V convertor 12, an amplifier 13, an A/D convertor 14, and a control section 20. Furthermore, the optical module 10 is configured by including a variable wavelength interference filter 5 and a voltage control section 15. Moreover, the variable wavelength interference filter 5 and the voltage control section 15 correspond to an actuator control device.

The detector 11 receives light transmitted through the variable wavelength interference filter 5 of the optical module 10 and outputs a detection signal (current) corresponding to light intensity of the received light.

The I-V convertor 12 converts the detection signal input from the detector 11 into a voltage value and outputs the voltage value to the amplifier 13.

The amplifier 13 amplifies the voltage (detection voltage) corresponding to the detection signal input from the I-V convertor 12.

The A/D convertor 14 converts the detection voltage (analog signal) input from the amplifier 13 into a digital signal and outputs the digital signal to the control section 20.

The voltage control section 15 drives the variable wavelength interference filter 5 based on control of control section 20 and transmits light having a predetermined target wavelength from the variable wavelength interference filter 5.

Configuration of Optical Module

Next, a configuration of the optical module 10 will be described.

Figure 2:
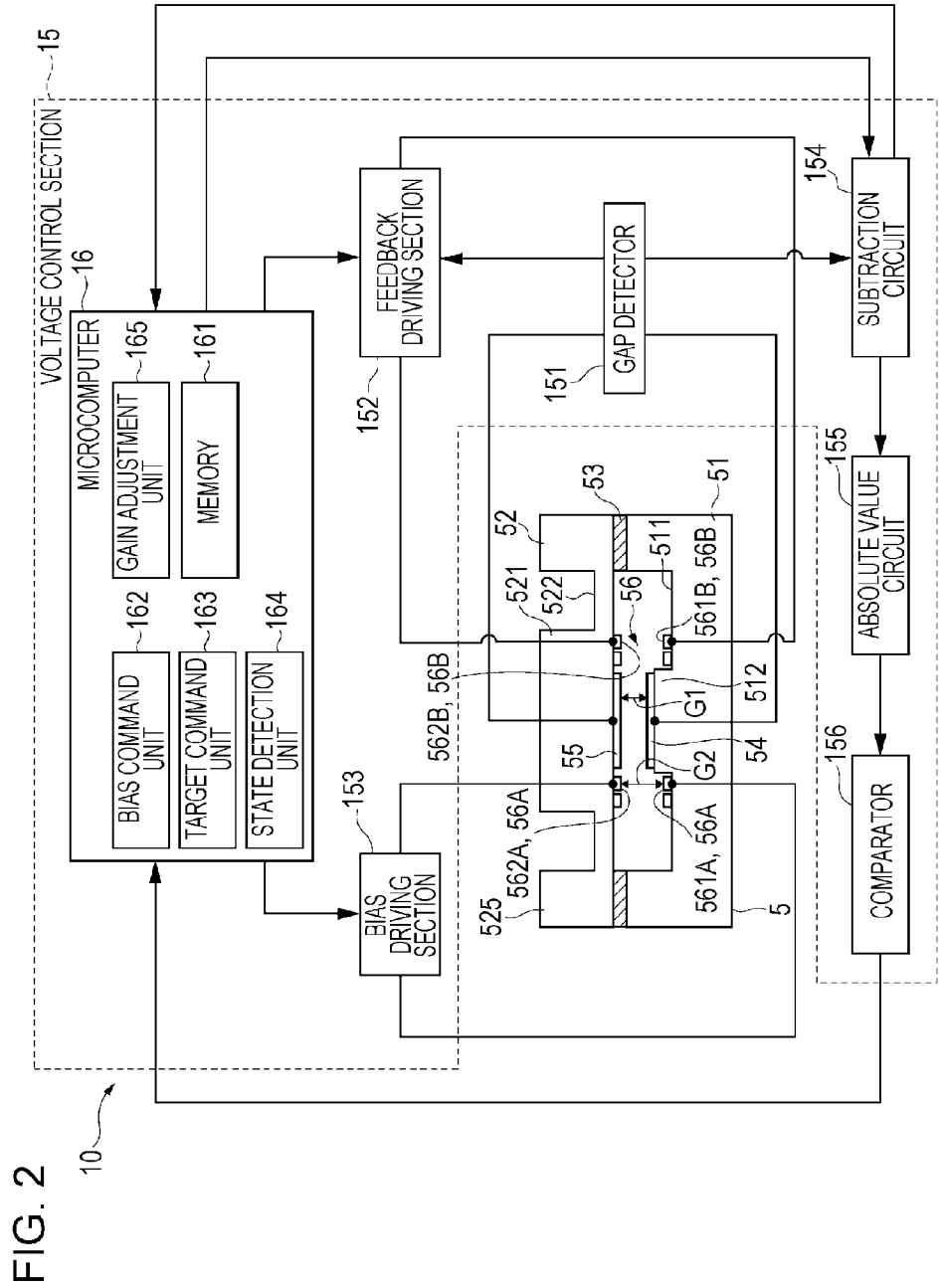
FIG. 2 is a diagram illustrating a schematic configuration of an optical module of the embodiment.

FIG. 2 is a block diagram illustrating a schematic configuration of the optical module 10.

As described above, the optical module 10 is configured by including the variable wavelength interference filter 5 and the voltage control section 15.

Configuration of Variable Wavelength Interference Filter

Hereinafter, the variable wavelength interference filter 5 of the optical module 10 will be described. FIG. 3 is a plan of a schematic configuration of the variable wavelength interference filter 5.

As illustrated in FIGS. 2 and 3, for example, the variable wavelength interference filter 5 is a rectangular plate-shaped optical member and includes a fixed substrate 51 (first member) and a movable substrate 52 (second member). For example, the fixed substrate 51 and the movable substrate 52 are formed of an insulating material such as various types of glass and crystal and, for example, are integrally configured by bonding by a bonding film 53 (see FIG. 2) configured of a plasma polymerization film composed mainly of siloxane.

The fixed substrate 51 is provided with a fixed reflective film 54 configuring one side of a pair of reflective films and the movable substrate 52 is provided with a movable reflective film 55 configuring the other side of the pair of reflective films. The fixed reflective film 54 and the movable reflective film 55 are disposed to face each other across a gap G1 (see FIG. 2).

Furthermore, the fixed substrate 51 is provided with a first fixed electrode 561A and the movable substrate 52 is provided with a first movable electrode 562A. The first fixed electrode 561A and the first movable electrode 562A are disposed to face each other across a predetermined gap. The first fixed electrode 561A and the first movable electrode 562A configure a first electrostatic actuator 56A that is an example of an actuator.

Furthermore, a second fixed electrode 561B is provided on the outside of the first fixed electrode 561A in the fixed substrate 51 and a second movable electrode 562B is provided on outside of the first movable electrode 562A in the movable substrate 52. The first fixed electrode 561A and the first movable electrode 562A are disposed to face each other across a predetermined gap. The first fixed electrode 561A and the first movable electrode 562A configure a second electrostatic actuator 56B that is an example of an actuator.

Moreover, in the following description, a plan view viewed from a thickness direction of substrates of the fixed substrate 51 and the movable substrate 52, that is, a plan view in which the variable wavelength interference filter 5 is viewed from a lamination direction of the fixed substrate 51, the bonding film 53, and the movable substrate 52 is referred to as a plan view of a filter. Moreover, in the embodiment, in a plan view of the filter, a center point of the fixed reflective film 54 and a center point of the movable reflective film 55 coincide and the center point of the reflective films in a plan view is referred to as a filter center point O and a line passing through the center point of the reflective films is referred to as a center axis.

Configuration of Fixed Substrate

As illustrated in FIG. 2, for example, the fixed substrate 51 includes an electrode arrangement groove 511 and a reflective film installation section 512 formed by etching and the like. Furthermore, one end side (side C1-C2 in FIG. 3) of the fixed substrate 51 protrudes further to the outside than a substrate edge (side C5-C6 in FIG. 3) of the movable substrate 52 and configures a first terminal taking-out section 514.

The electrode arrangement groove 511 is formed in an annular shape which is centered on the filter center point O of the fixed substrate 51 in a plan view of the filter. The reflective film installation section 512 is formed so as to protrude from the center portion of the electrode arrangement groove 511 to the movable substrate 52 in a plan view of the filter. The first fixed electrode 561A of the first electrostatic actuator 56A is provided on a groove bottom surface of the electrode arrangement groove 511. Furthermore, the fixed reflective film 54 is provided on a protruding leading end surface of the reflective film installation section 512.

Furthermore, the fixed substrate 51 is provided with an electrode lead-out groove (not illustrated) extending from the electrode arrangement groove 511 to an outer periphery of the fixed substrate 51.

For example, the first fixed electrode 561A is formed in an arc shape (substantially C-shape) and as illustrated in FIG. 3, a C-shaped opening is provided in a part that is close to the side C1-C2. Furthermore, an insulation film may be laminated on the first fixed electrode 561A to ensure insulation between the first fixed electrode 561A and the first movable electrode 562A.

Similar to the first fixed electrode 561A, the second fixed electrode 561B is formed in an arc shape (substantially C-shape) and C-shape opening is provided in a part that is close to the side C1-C2. Furthermore, an insulation film may be laminated on the second fixed electrode 561B to ensure insulation between the second fixed electrode 561B and the second movable electrode 562B.

Then, the first fixed electrode 561A includes a first fixed lead-out electrode 563A extending to the first terminal taking-out section 514 along the electrode lead-out groove. Furthermore, the second fixed electrode 561B includes a second fixed lead-out electrode 563B extending to the first terminal taking-out section 514 along the electrode lead-out groove. For example, an extending leading end portion of each of the fixed lead-out electrode 563A and 563B is connected to the voltage control section 15 by flexible printed circuits (FPC) or a lead wire, and the like.

For example, the fixed reflective film 54 provided on the protruding leading end surface of the reflective film installation section 512 is configured of a reflective film material having conductivity such as a metal film of Ag and the like, or an Ag alloy. Moreover, for example, as the fixed reflective film 54, a dielectric multilayer film in which a high refractive layer is $TiO_2$ and a low refractive layer is $SiO_2$ may be used. If the dielectric multilayer film is used as the fixed reflective film 54, the conductivity is maintained by laminating the conductive film on the lowermost layer and the uppermost layer (surface layer) of the dielectric multilayer film. As the conductive film, for example, a reflective film such as the Ag alloy having high reflectance characteristics for a wide wavelength range may be used. In this case, it is possible to widen a measurement object wavelength range of the variable wavelength interference filter 5 by the conductive film, to take out (emit) a desired target wavelength for the wide wavelength range, and to take out the light of the target wavelength with high resolution by the dielectric multilayer film. Furthermore, in order to improve adhesion between the conductive film and the reflective film installation section 512 or between the conductive film and the dielectric multilayer film, a transparent adhesive layer may be further disposed.

Then, as illustrated in FIG. 3, the fixed substrate is provided with a first mirror electrode 541 that is connected to the outer periphery of the fixed reflective film 54 and extends to the first terminal taking-out section 514 through the C-shape opening of the first fixed electrode 561A and the second fixed electrode 561B. The first mirror electrode 541 is formed by being deposited at the same time as the formation of the fixed reflective film 54.

Then, the first mirror electrode 541 is connected to the voltage control section 15 on the first terminal taking-out section 514.

A region in which the electrode arrangement groove 511, the reflective film installation section 512, and the electrode lead-out groove of the fixed substrate 51 are not formed is bonded to the movable substrate 52 by the bonding film 53.

Moreover, in FIG. 3, the fixed reflective film 54, the first fixed electrode 561A, the second fixed electrode 561B, each of the fixed lead-out electrodes 563A and 563B, and the first mirror electrode 541 provided on the side of the fixed substrate 51 are practically provided on a surface facing the movable substrate 52 of the fixed substrate 51 and are indicated in solid lines for description.

Configuration of Movable Substrate

The movable substrate 52 includes a movable section 521 that has an annular shape which is centered on the filter center point in a plan view of the filter as illustrated in FIG. 3, a holding section 522 that is coaxial with the movable section 521 and holds the movable section 521, and a substrate outer periphery section 525 that is provided on the outside of the holding section 522.

Furthermore, as illustrated in FIG. 3, the movable substrate 52 is configured of a second terminal taking-out section 524 of which one end side (side C7-C8 in FIG. 3) protrudes further to the outside than the substrate edge (side C3-C4 in FIG. 3) of the fixed substrate 51.

The movable section 521 is formed such that a thickness dimension thereof is greater than that of the holding section 522 and, for example, in the embodiment, the thickness dimension is the same as a thickness dimension of the movable substrate 52. The movable section 521 is formed such that a diameter dimension thereof is greater than at least that of the outer periphery of the reflective film installation section 512 in a plan view of the filter. Then, the movable reflective film 55 and the first movable electrode 562A are provided on a movable surface of the movable section 521 facing the fixed substrate 51.

The first movable electrode 562A is provided on the outer periphery side of the movable reflective film 55 in a plan view of the filter and is disposed facing the first fixed electrode 561A across a gap. The first movable electrode 562A is formed having an arc shape (substantially C-shape) and, as illustrated in FIG. 3, the C-shape opening is provided in a part that is close to the side C7-C8. Furthermore, similar to the first fixed electrode 561A, an insulation film may be laminated on the first movable electrode 562A.

The second movable electrode 562B is provided on the outer periphery side of the first movable electrode 562A in a plan view of the filter and is disposed facing the second fixed electrode 561B across a gap. Similar to the first movable electrode 562A, the second movable electrode 562B is formed having an arc shape (substantially C-shape) and the C-shape opening is provided in a part that is close to the side C7-C8. Furthermore, similar to the first movable electrode 562A, an insulation film may be laminated on the second movable electrode 562B.

Here, as illustrated in FIG. 3, the first electrostatic actuator 56A is configured of an arc region (region indicated by downward-sloping hatched portions in FIG. 3) in which the first movable electrode 562A and the first fixed electrode 561A overlap in a plan view of the filter. Furthermore, the second electrostatic actuator 56B is configured of an arc region (region indicated by upward-sloping hatched portions in FIG. 3) in which the second movable electrode 562B and the second fixed electrode 561B overlap. As illustrated in FIG. 3, each of the electrostatic actuators 56A and 56B is formed and disposed to be point-symmetric with respect to the filter center point O in a plan view of the filter. Thus, an electrostatic attracting force generated when applying the voltage to each of the electrostatic actuators 56A and 56B also acts on a position that is to be point-symmetric with respect to the filter center point O and can displace the movable section 521 on the fixed substrate 51 side with good balance.

Furthermore, as illustrated in FIG. 3, the first movable electrode 562A is provided with a first movable lead-out electrode 564A extending to the second terminal taking-out section 524. Furthermore, the second movable electrode 562B is provided with a second movable lead-out electrode 564B extending to the second terminal taking-out section 524. Each of the movable lead-out electrodes 564A and 564B is disposed along a position facing the electrode lead-out groove provided in the fixed substrate 51. Furthermore, for example, an extending leading end portion of each of the movable lead-out electrodes 564A and 564B is connected to the voltage control section 15 by the FPC or the lead wire and the like.

The movable reflective film 55 is provided in the center portion of the movable section 521 by facing the fixed reflective film 54 through the gap G1 between the reflective films. For the movable reflective film 55, a reflective film having the same configuration as the fixed reflective film 54 described above is used. Moreover, in the embodiment, the gap G1 between the reflective films 54 and 55 is smaller than the gap G2 between the electrodes 561A and 562A (electrodes 561B and 562B).

Furthermore, as illustrated in FIG. 3, the movable substrate 52 is provided with a second mirror electrode 551 that is connected to the outer periphery of the movable reflective film 55, passes through the C-shape opening of the first movable electrode 562A and the second movable electrode 562B, and extends to the second terminal taking-out section 524.

Furthermore, if the movable reflective film 55 is configured of a laminated body of the dielectric multilayer film and the conductive film, the second mirror electrode 551 is formed at the same time as formation of conductive film and is connected to the conductive film.

Then, for example, the second mirror electrode 551 is connected to the voltage control section 15 by the FPC or the lead wire and the like on the second terminal taking-out section 524.

Moreover, in the embodiment, as illustrated in FIG. 2, an example in which a gap G2 between the electrodes 561A and 562B is greater than the gap G1 is illustrated but the invention is not limited to the example. For example, if infrared light is an object as the measurement object light, the gap G1 may be greater than the gap G2 between the electrodes 561A and 562A depending on a measurement object wavelength range.

The holding section 522 is a diaphragm surrounding a periphery of the movable section 521 and of which a thickness dimension is smaller than that of the movable section 521. Such a holding section 522 is easily bent more than the movable section 521 and can displace the movable section 521 to the fixed substrate 51 side. At this time, since the thickness dimension of the movable section 521 greater than that of the holding section 522 and rigidity is increased, even if the holding section 522 is pulled toward the fixed substrate 51 side by the electrostatic attracting force, a change in a shape of the movable section 521 is suppressed. Thus, bending of the movable reflective film 55 provided in the movable section 521 is unlikely to occur and it is possible to always maintain the fixed reflective film 54 and the movable reflective film 55 in a parallel state.

Moreover, in the embodiment, the diaphragm-shaped the holding section 522 is exemplified, but the invention is not limited to the embodiment and, for example, a configuration in which beam-shaped holding sections arranged at equal angular intervals centered on the filter center point O is provided may be included.

As described above, the substrate outer periphery section 525 is provided on the outside of the holding section 522 in a plan view of the filter. A surface of the substrate outer periphery section 525 facing the fixed substrate 51 is bonded to the fixed substrate 51 through the bonding film 53.

Configuration of Voltage Control Section

As illustrated in FIG. 2, the voltage control section 15 is configured by including a gap detector 151 (a detection unit), a feedback driving section 152, a bias driving section 153, a subtraction circuit 154, an absolute value circuit 155, a comparator 156, a microcomputer (micro-controller) 16.

FIG. 4 is a conceptual diagram of a closed loop system using the voltage control section 15.

As illustrated in FIG. 4, the voltage control section 15 configures a closed loop system (corresponding to a feedback locking operation) by the electrostatic actuators 56A and 56B of the variable wavelength interference filter 5, the gap detector 151, the feedback driving section 152, the bias driving section 153, the subtraction circuit 154, the absolute value circuit 155, the comparator 156. Then, in the embodiment, the microcomputer 16 appropriately maintains a control state when performing the feedback control by controlling the bias driving section 153 and the feedback driving section 152 in the closed loop system based on the drive characteristics of each of the electrostatic actuator 56A and 56B.

Hereinafter, a configuration of the voltage control section 15 will be described in detail.

The gap detector 151 is connected to the first mirror electrode 541 and the second mirror electrode 551 of the variable wavelength interference filter 5. The gap detector 151 detects the dimension of the gap G1 between the reflective films 54 and 55, which is varied by the drive of each of the electrostatic actuators 56A and 56B and outputs a detection signal. Here, it is possible to easily calculate a drive amount of each of the electrostatic actuator 56A and 56B by detecting the gap dimension of the gap G1 and the gap detector 151 functions as a detection unit.

Specifically, the gap detector 151 has a C-V converting circuit and converts an electrostatic capacitance between the reflective films 54 and 55 to a voltage value (detection signal). As the C-V converting circuit, a switch-capacitor circuit may be exemplified.

Then, the gap detector 151 outputs the detection signal to the feedback driving section 152 and the subtraction circuit 154.

Moreover, the gap detector 151 may output an analog signal or a digital signal as the detection signal. If the digital signal is output, the detection signal (analog signal) from the C-V converting circuit is input into an Analog to Digital Converter (ADC) and the analog signal is converted to the digital signal.

The feedback driving section 152 corresponds to a controller and is connected to the second fixed lead-out electrode 563B and the second movable lead-out electrode 564B of the variable wavelength interference filter 5. Then, the feedback driving section 152 applies the drive voltage (hereinafter, referred to as a feedback voltage) to the second electrostatic actuator 56B based on a command signal including a target value input from the microcomputer.

Furthermore, the feedback driving section 152 performs control by increasing and decreasing the drive voltage with respect to each of the electrostatic actuator 56A and 56B such that a deviation between the detection signal from the gap detector 151 and the command signal input from the microcomputer 16 is a predetermined threshold or less. That is, the feedback driving section 152 performs the feedback control based on the detection signal and the command signal.

Furthermore, the feedback driving section 152 can vary the gain by the control of the microcomputer 16. The gain of an entire closed loop system is adjusted by varying the gain of the feedback driving section 152.

Specifically, as the feedback driving section 152, if an analog type controller is used, a gain setting circuit capable of setting any one of a plurality of gains is provided in the controller. Then, the gain of the gain setting circuit is set to a predetermined gain by a control signal from the microcomputer 16.

Furthermore, as the feedback driving section 152, if a digital type controller is used, the gain can be set to a predetermined gain by rewriting a parameter (register value) of a control gain based on the signal of the microcomputer 16.

The bias driving section 153 is connected to the first fixed lead-out electrode 563A and the first movable lead-out electrode 564A of the variable wavelength interference filter 5. Then, the bias driving section 153 applies the bias voltage to the first electrostatic actuator 56A. Specifically, the bias driving section 153 applies the voltage to the first electrostatic actuator 56A based on the bias signal input from the microcomputer 16.

The subtraction circuit 154 subtracts the detection signal (voltage signal) corresponding to the dimension of the gap G1 detected by the gap detector 151 and the command signal (voltage signal) corresponding to the setting value of the dimension of the gap G1 output from the microcomputer 16, and outputs a subtraction signal to the absolute value circuit 155 and the microcomputer 16. That is, the deviation between the detection value and the setting value is calculated and outputs to the absolute value circuit 155 and the microcomputer 16. For example, the subtraction circuit 154 is an analog subtraction circuit configured of a circuit such as an operational amplifier and is connected to the gap detector 151, the absolute value circuit 155, and the microcomputer 16.

The absolute value circuit 155 converts the voltage value of the instruction signal from the subtraction circuit 154 into the absolute value and inputs the absolute value to the comparator 156. Here, the output from the subtraction circuit 154 may take a positive or negative value. If the signal of the negative value is directly input from the subtraction circuit 154 to the comparator 156, malfunction of the comparator 156 is generated. It is possible to prevent the malfunction by providing the absolute value circuit 155. The absolute value circuit 155 is an analog circuit configured of a diode and the operational amplifier, and is connected to the subtraction circuit 154 and the comparator 156.

The comparator 156 compares an output $V_{abs}$ of the absolute value circuit 155 and a threshold voltage $V_{th}$, and outputs a voltage signal of High level $V_H$ if $V_{abs} > V_{th}$, and outputs a voltage signal of Low level $V_L$ if $V_{abs} \leq V_{th}$. The output signal from the comparator 156 is input into the microcomputer 16. Such a the comparator 156 may be configured of a general purpose Integrated Circuit (IC) and is connected to the absolute value circuit 155 and the microcomputer 16.

In addition, in the embodiment, the deviation detection unit is configured of the subtraction circuit 154, the absolute value circuit 155, and the comparator 156.

The microcomputer 16 includes a memory 161 and, for example, stores a relationship (gap correlated data) between the detection signal (voltage signal) detected by the gap detector 151 and the dimension of the gap G1. Moreover, as the gap correlated data, the dimension of the gap G2 for the detection signal may be stored.

The microcomputer 16 is configured of a microcomputer or a gate array, and the like, and is connected to the control circuit, the subtraction circuit, and the comparator. Then, as illustrated in FIG. 2, the microcomputer 16 functions as a bias command unit 162, a target command unit 163, a state detection unit 164, and a gain adjustment unit 165.

The bias command unit 162 outputs a bias command that commands application of the bias voltage to the bias driving section 153 based on a wavelength setting command input from the control section 20. Furthermore, the bias command unit 162 corrects the bias voltage (corresponding to a drive parameter) by the bias driving section 153 depending on error contents of the feedback control detected by the state detection unit 164 described below and sets a new bias voltage. That is, the bias command unit 162 functions as a parameter correction unit.

If the wavelength setting command is input from the control section 20, the target command unit 163 calculates the dimension (target value) of the gap G1 corresponding to the target wavelength and outputs the dimension to the feedback control section 152 and the subtraction circuit 154 as the target signal.

The state detection unit 164 detects a variation state of the gap G1 of the variable wavelength interference filter 5 based on the output signal from the comparator 156.

Specifically, if the voltage signal output from the comparator 156 is continuously the voltage signal of the Low level $V_L$ after elapse of the stabilization time, the state detection unit 164 detects that the variation of the gap G1 of the variable wavelength interference filter 5 converges on the stabilized state.

Furthermore, if the state detection unit 164 outputs the output signal of the High level $V_H$ from the comparator 156 after elapse of the stabilization time, the feedback control is not normally performed and the error is generated. As described below, the generated error contents are detected based on the output signal from the comparator 156.

The gain adjustment unit 165 sets the gain of the feedback control section 152 depending on the error contents detected by the state detection unit 164. That is, the gain adjustment unit 165 corrects the value of the gain corresponding to the feedback voltage (corresponding to a drive parameter) that is set depending on the error contents of the feedback control and sets the gain corresponding to new feedback voltage. That is, the gain adjustment unit 165 functions as a parameter correction unit.

Moreover, each function of the bias command unit 162, the target command unit 163, the state detection unit 164, and the gain adjustment unit 165 will be described below.

Configuration of Control Section

Returning to FIG. 1, the control section 20 of the spectroscopic measurement apparatus 1 will be described.

The control section 20 corresponds to a processing section, is, for example, configured by combining a CPU or memory, and the like, and controls an entire operation of the spectroscopic measurement apparatus 1. As illustrated in FIG. 1, the control section 20 includes a wavelength setting section 21, a light amount obtaining section 22, a spectroscopic measurement section 23, and a storage section 30.

Various programs or various data (for example, V-λ data indicating the drive voltage for the target wavelength and the like) for controlling the spectroscopic measurement apparatus 1 are recorded in the storage section 30.

The wavelength setting section 21 sets the target wavelength of the light taken out by the variable wavelength interference filter 5 and outputs the control signal of indicating that the set target wavelength is taken out from the variable wavelength interference filter 5 to the voltage control section 15.

The light amount obtaining section 22 obtains a light amount of the target wavelength transmitting the variable wavelength interference filter 5 based on the light amount obtained by the detector 11.

The spectroscopic measurement section 23 measures spectral characteristics of the measurement object light based on the light amount obtained by the light amount obtaining section 22.

Driving Method of Variable Wavelength Interference Filter

FIG. 4 is a flowchart illustrating a driving method (control method of the actuator) of the variable wavelength interference filter in a spectroscopic measurement process of the spectroscopic measurement apparatus 1.

In order to obtain a light intensity of each wavelength including in the measurement object light by the spectroscopic measurement apparatus 1, first, the control section 20 sets the wavelength (target wavelength) of the light transmitting the variable wavelength interference filter 5 by the wavelength setting section 21. Then, the wavelength setting section 21 outputs the wavelength setting command of indicating that the light of the set target wavelength is transmitted to the voltage control section 15 (step S1).

Next, the voltage control section 15 drives the variable wavelength interference filter 5 based on the wavelength setting command from the wavelength setting section 21 and starts the feedback control for setting the gap dimension to the target wavelength (step S2).

Specifically, the bias command unit 162 of the microcomputer 16 outputs the bias signal depending on the target value of the gap G2 to the bias driving section 153 based on the target wavelength contained in the input wavelength setting command. The bias driving section 153 applies the bias voltage to the first electrostatic actuator 56A based on the bias signal.

When the voltage is applied to each of the electrostatic actuators 56A and 56B of the variable wavelength interference filter 5, the variation of the value of the gap G2 is started and the feedback control is started. The gap detector 151 outputs the detection signal corresponding to the detection value (voltage value) of the dimension of the gap G1, the subtraction circuit 154 subtracts the detection value of the gap detector 151 and the setting value (voltage value) of the dimension of the gap G1, and outputs the subtraction signal to the absolute value circuit 155 and the microcomputer 16. The absolute value circuit 155 converts the value of the subtraction signal from the subtraction circuit 154 into the absolute value and outputs the absolute value to the comparator 156. The comparator 156 compares the output $V_{abs}$ of the absolute value circuit 155 and the threshold voltage $V_{th}$, and outputs the voltage signal (High level $V_H$ or Low level $V_L$) depending on a comparison result as described above.

Moreover, the bias command unit 162 outputs the target signal using data or program and the like stored in the memory 161. For example, data corresponding to the target wavelength and the dimension (or detection value of the gap detector 151) of the gap G2 or a program for calculating the dimension (or detection value of the gap detector 151) of the gap G2 corresponding to the target wavelength and the like are stored in the memory 161. The bias command unit 162 outputs the bias signal using the data or the program and the like.

The bias voltage is set to be an angle smaller than the drive voltage to set the gap G1 between the reflective films to the target gap amount by driving the bias driving section 153 alone. It is possible to decrease the sensitivity and that is improve the accuracy of the feedback control by applying the bias voltage in the control of the second electrostatic actuator 56B by the feedback control section 152 compared to a case where the bias voltage is not applied.

Furthermore, for example, the bias command unit 162 may calculate the bias voltage corresponding to the target value of the gap G1 as below. That is, in the feedback control, the bias voltage is set such that the sensitivity (gap displacement amount (m/V) with respect to the applied voltage) when applying the voltage to the second electrostatic actuator 56B is constant. Here, sensitivity $R_c$ (m/V) when applying the voltage to the second electrostatic actuator 56B is represented by following Expression (1).

$$R_C = \frac{\{2k\varepsilon S_C d(d_{max} - d)^2 - \varepsilon^2 S_C S_b V_b^2\}^{1/2}}{k(d_{max} - d)(d_{max} - 3d)} \tag{1}$$

In Expression (1), $V_b$ is the bias voltage applying to the first electrostatic actuator 56A, k is the spring coefficient of the movable substrate 52 (the holding section 522), $\varepsilon$ is a dielectric constant between the fixed substrate and the movable substrate 52 (the gap G2 between the electrodes), $S_b$ is an effective area (an area of a region in which the first fixed electrode 561A and the first movable electrode 562A overlap in a plan view of the filter) of the first electrostatic actuator 56A, $S_c$ is an effective area of the second electrostatic actuator 56B, $d_{max}$ is the initial gap amount of the gap G2 between the electrodes, d is the target displacement amount (gap displacement amount of the gap G2 between the electrodes) of the movable section 521 to transmit the light of the target wavelength.

It is preferable that the bias voltage $V_b$ be applied in the feedback control such that the sensitivity when applying the voltage to the second electrostatic actuator 56B is constant. In this case, in Expression (1), $V_c$ is a constant value and a value that is set in advance depending on the fixed gain in the controller configuring the feedback driving section 152 is used. If the gain is changed in the controller of the feedback driving section 152 by an error correction described below, a value depending on the gain is used.

Furthermore, when the wavelength setting command designating the target wavelength is input from the control section 20, the microcomputer 16 can calculate the target value of the gap G1 that is desired for taking out the light of the target wavelength from the variable wavelength interference filter 5 and can calculate an amount (target displacement amount d) to displace the movable section 521 from the target value.

When solving for $V_b$ in Expression (1) described above, the following Expression (2) is derived.

$$V_b = \left[\frac{k}{\varepsilon S_b}\left\{2d(d_{max} - d)^2 - \frac{kR_c^2(d_{max} - d)^2(d_{max} - 3d)^2}{\varepsilon S_c}\right\}\right]^{1/2} \tag{2}$$

Furthermore, the target command unit 163 outputs the target signal indicating the target value of the gap G2 of the second electrostatic actuator 56B to the feedback control section 152 and the subtraction circuit 154 based on the target value contained in the wavelength setting command input in step S1.

The feedback control section 152 controls the drive voltage applied to the second electrostatic actuator 56B such that the deviation between the detection signal input from the gap detector 151 and the target signal approaches 0.

Next, the state detection unit 164 determines that the gap dimension of the variable wavelength interference filter 5 is stabilized (step S3). In step S3, the state detection unit 164 determines whether or not the voltage signal from the comparator 156 is continuously the Low level $V_L$.

In step S3, it is determined "NO", the state detection unit 164 determines whether or not a predetermined time $T_0$ elapses (step S4).

For example, for the predetermined time $T_0$, it is preferable that the stabilization time and the like be set when the gap G1 is varied from the initial gap to the minimum gap. In step S4, it is determined "NO", the process returns to step S3 and the determination whether or not the gap G1 is stabilized is continued until elapse of the predetermined time $T_0$.

Figure 5A:
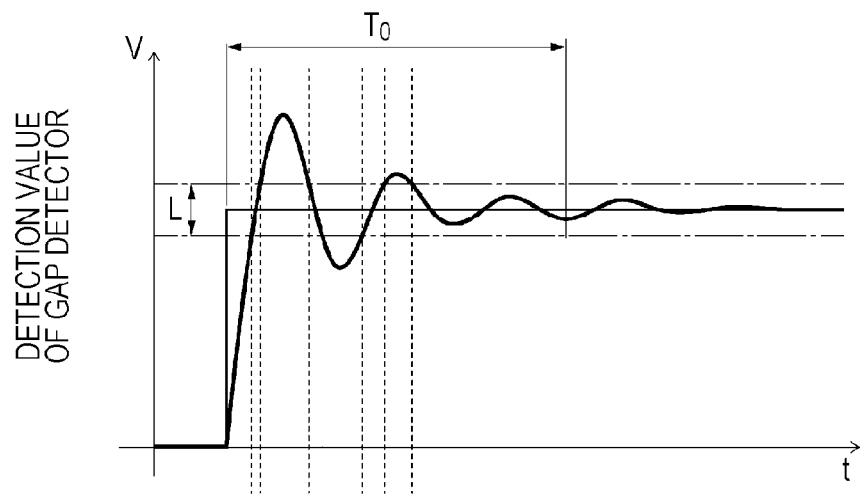
FIGS. 5A and 5B are graphs illustrating an example of output values of a gap detector and a comparator when feedback control is normally performed.
Figure 5B:
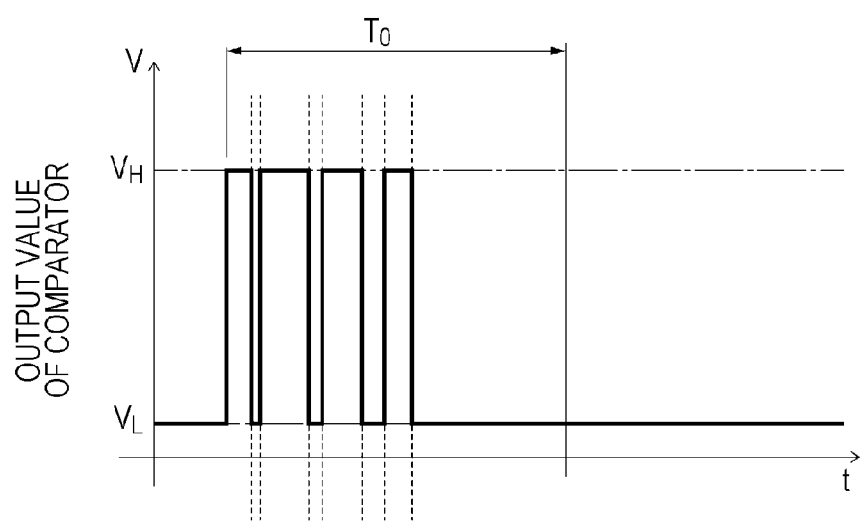

Here, FIGS. 5A and 5B are graphs illustrating an example of the output values of the gap detector 151 and the comparator 156 when the feedback control is normally performed. FIG. 5A is a graph illustrating the detection value of the gap detector 151 and FIG. 5B is a graph illustrating the output value of comparator.

As illustrated in FIG. 5A, when the drive of the variable wavelength interference filter 5 is started and the feedback control is performed, the detection value of the gap detector 151 vibrates. Then, if the feedback control is normally performed, the vibration of the detection value converges and is stabilized within a predetermined stabilization time. Usually, the detection value converges on allowable range in approximately two cycles from the start of the vibration and is stabilized.

In the stabilized state, a state where the $V_{abs}$ that is the absolute value of the detection value of the gap detector 151 is the threshold voltage $V_{th}$ is continued. That is, the detection value of the gap detector 151 converges on an allowable range L indicated by a one-dotted chain line of FIG. 5A.

Moreover, the allowable range L is a predetermined voltage range centered on the target value indicated by a thin solid line of FIG. 5 and is set depending on the specification or measurement accuracy and the like of the variable wavelength interference filter 5, and, for example, is a range of ±10 mV centered on the target value.

It is not determined to be stabilized by the state detection unit 164 until the predetermined time $T_0$ elapses (step S3; No, and step S4; Yes), that is, if the variation of the gap G1 is not stabilized (variation does not converge) until the time to be stabilized, the state detection unit 164 detects that a feedback error is generated in the closed loop system. In this case, the state detection unit 164 determines whether or not a feedback error of a steady-state deviation type is detected (step S5). Specifically, in the state detection unit 164, it is determined whether or not the voltage signal output from the comparator 156 is only in the High level $V_H$ in a determination time $T_1$.

In step S5, it is determined "Yes", it is determined that the feedback error of the steady-state deviation type is generated.

Figure 6A:
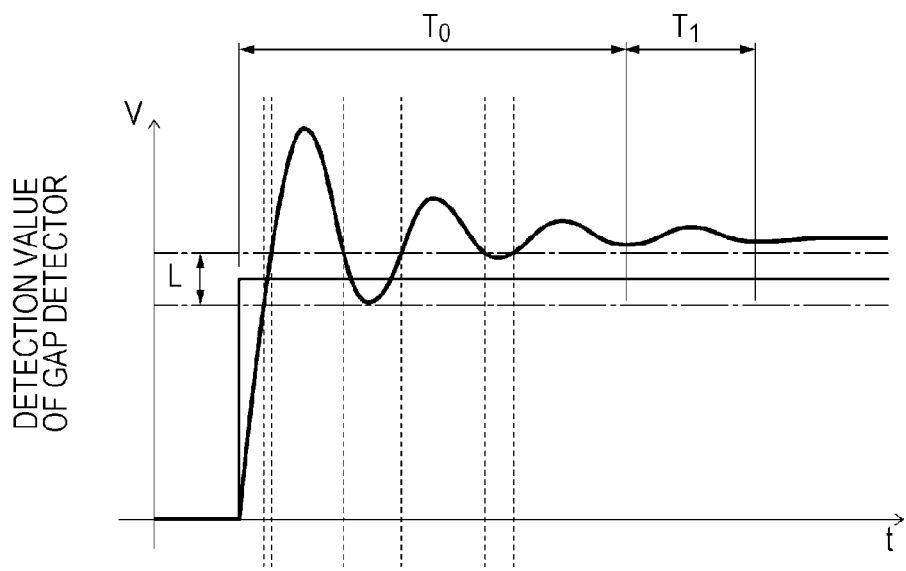
FIGS. 6A and 6B are graphs illustrating an example of output values of the gap detector and the comparator when a drive amount converges on the outside of an allowable range.
Figure 6B:
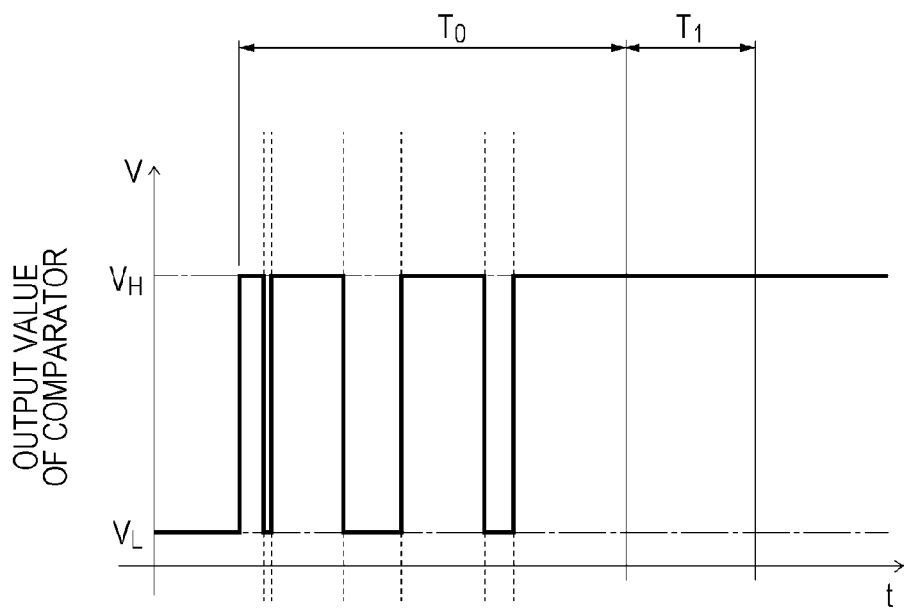

FIGS. 6A and 6B are graphs illustrating an example of characters of output values of the gap detector and the comparator when the feedback error of the steady-state deviation type is generated.

As illustrated in FIGS. 6A and 6B, in the feedback error of the steady-state deviation type, the detection value converges exceeding the allowable range after the predetermined time $T_0$ elapses. Moreover, in FIGS. 6A and 6B, an example in which the detection value converges above the upper limit is illustrated and illustration of a case where the detection value converges below the lower limit is omitted.

As illustrated in FIG. 6B, in the feedback error of the steady-state deviation type, the signal of the Low level $V_L$ is output from the comparator 156 until a predetermined determination time $T_1$ elapses after the elapse of the predetermined time $T_0$ as the voltage signal from the comparator 156. Thus, in the state detection unit 164, it is possible to determine whether or not the feedback error of the steady-state deviation type by detecting whether or not the High level $V_H$ is continuously detected within the determination time $T_1$.

In this case, the bias command unit 162 resets the bias voltage in the bias driving section 153 (step S6).

Specifically, as illustrated in FIG. 6A, if the deviation between the detection value input from the subtraction circuit 154 into the microcomputer 16 and the target value is the positive value, the bias command unit 162 determines that the feedback error of the steady-state deviation type in which the electrostatic capacitance value that is the detection value converges on a value exceeding the upper limit of the allowable range is generated. In this case, the bias command unit 162 decreases the bias voltage value so as to decrease the electrostatic capacitance value.

In contrast, if the deviation between the detection value input from the subtraction circuit 154 and the target value is the negative value, the bias command unit 162 determines that the detection value converges on a value below the lower limit of the allowable range and increases the bias voltage so as to increase the electrostatic capacitance value.

Meanwhile, in step S5, it is determined "No", that is, if the voltage signals of the High level $V_H$ and the Low level $V_L$ are alternately output within the determination time $T_1$, the state detection unit 164 determines it is a feedback error (oscillation error) of a vibration type.

Figure 7A:
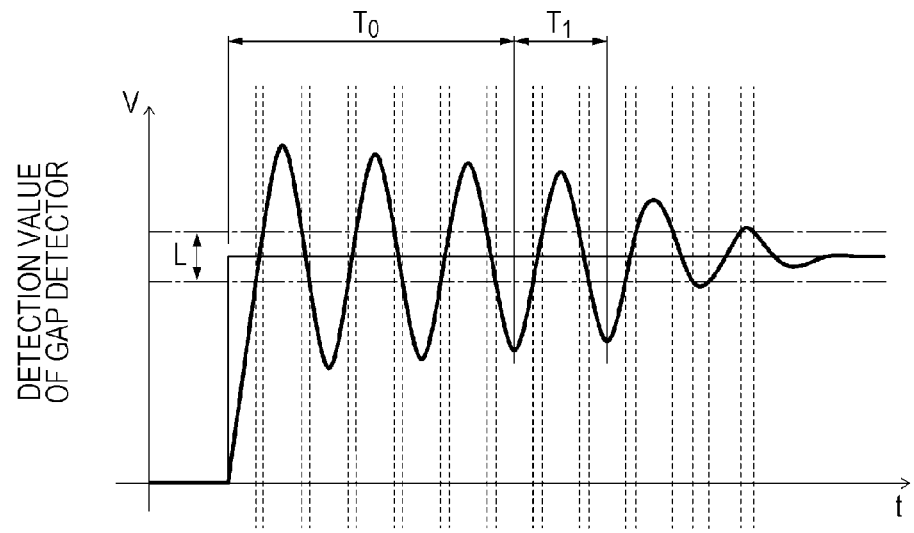
FIGS. 7A and 7B are graphs illustrating an example of output values of the gap detector and the comparator when a drive amount vibrates.
Figure 7B:
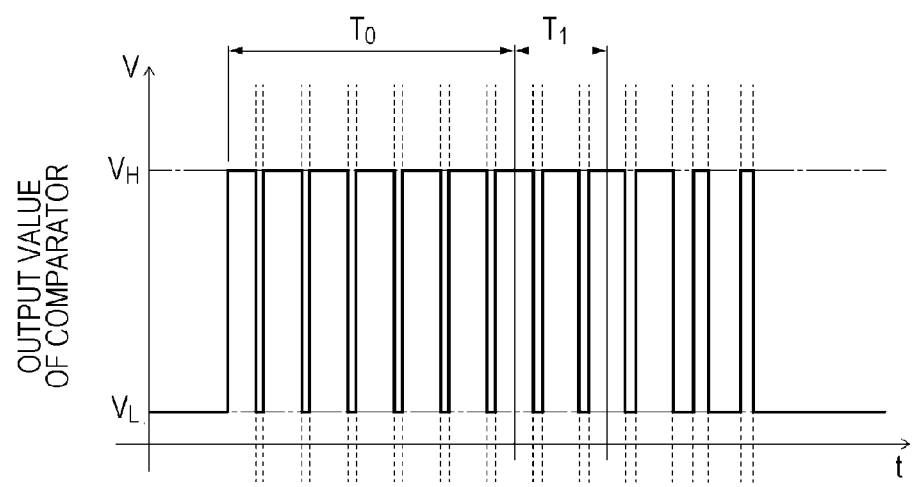

FIGS. 7A and 7B are graphs illustrating an example of characters of output values of the gap detector and the comparator when the feedback error of the vibration type is generated.

As illustrated in FIG. 7B, in the oscillation error, the signals of the High level $V_H$ and the Low level $V_L$ are output several times from the comparator 156 until the determination time $T_1$ elapses from the elapse of the predetermined time $T_0$. Thus, the state detection unit 164 can detect the oscillation error by detecting the voltage signals of the High level $V_H$ and the Low level $V_L$ that are alternately output within the determination time $T_1$.

In this case, the gain adjustment unit 165 sets the gain of the feedback control section 152 and controls the feedback voltage (step S7).

Here, as illustrated in FIG. 7A, if the electrostatic capacitance value that is the detection value does not converges and a feedback control error of the vibration type is generated, the gain of the feedback control of the feedback control section 152 is considered to be increased. Thus, the gain adjustment unit 165 decreases the gain of the feedback control of the feedback control section 152.

Moreover, if a Proportional Integral Derivative (PID) control in which the feedback control of high accuracy can be performed is employed, for example, the feedback control section 152 is considered that the gain (for example, proportional gain) about a proportional operation (P operation) is increased. Thus, the gain adjustment unit 165 decreases the predetermined gap of the feedback control of the feedback control section 152.

Moreover, for example, the predetermined determination time $T_1$ is a predetermined long time of one cycle or more of a vibration cycle (specific cycle determined by spring characters and the like of the holding section 522 in the variable wavelength interference filter 5) of the detection value. Even when vibrating (oscillating) or even when converging, it is possible to detect the error by making the determination time $T_1$ be one cycle or more of the vibration cycle.

Furthermore, the gain adjustment unit 165 outputs the target signal using the data or program and the like stored in the memory 161. For example, data in which the target wavelength corresponds to the feedback voltage (or the value of the gain of the feedback control section 152) or the program for calculating the feedback voltage corresponding to the target wavelength and the like are stored in the memory 161. The gain adjustment unit 165 calculates the feedback voltage (or the value of the gain of the feedback control section 152) using the data or the program and the like. The target command unit 163 outputs the target signal to the feedback control section 152 depending on a calculation result.

Steps S3 to S7 described above are repeated until it is determined to have stabilized in step S3.

Moreover, even if the error of the steady-state deviation type illustrated in FIGS. 6A and 6B, and the error of the vibration type illustrated in FIGS. 7A and 7B are generated at the same time, it is possible to be stabilized by repeating steps S3 to S7 described above. For example, if the detection value is transmitted in a range above the upper limit value or a range below the lower limit voltage of allowable range L, in step S5, the variation of the voltage signal of the comparator 156 is not detected (step S5; No). Thus, initially, the gain of the bias driving section is adjusted. Thereafter, the variation (that is, the error of the vibration type) of the voltage signal of the comparator 156 is detected and the gain of the feedback control section 152 is adjusted.

If the dimension of the gap G1 of the variable wavelength interference filter 5 is a dimension corresponding to the target wavelength separated in step S1, it is determined to have stabilized in step S3. Then, the light centered on the target wavelength is emitted from the variable wavelength interference filter 5. The light of the target wavelength is received in the detector 11 and the light amount obtaining section 22 of the control section 20 obtains the light amount of the light of the target wavelength based on the light amount detection signal input from the detector 11 (step S8).

Operational Effects of Embodiment

The voltage control section 15 applies the drive voltage (bias voltage and feedback voltage) depending on the target value (setting value) of the drive amount of each of the electrostatic actuators 56A and 56B. If the deference between the detection value of the gap detector 151 and the setting value exceeds allowable range L after the predetermined time $T_0$ elapses from the drive start, the output of the comparator 156 may be the High level $V_H$. The state detection unit 164 detects that the output of the comparator 156 is the High level $V_H$. That is, it is determined whether or not the absolute value of the deviation between the detection value of the drive amount and the setting value is within allowable range L while the drive of each of the electrostatic actuators 56A and 56B is stabilized.

Thus, it is possible to detect that the feedback control is not appropriately performed, the practical dimension (drive amount) of the gap G1 is stabilized at a value exceeding a predetermined threshold to the setting value of the dimension (drive amount) of the gap G1, or vibration continues. It is possible to detect the error of the feedback control.

Here, in the feedback control, in order to stabilize the actuator within the stabilization time, it is preferable that a value of the voltage value (drive parameter) applied by the feedback control section 152 or the bias driving section 153 be an appropriate value. For example, if the value of the gain (drive parameter) of the feedback control section 152 is greater than the appropriate value, the drive amount variation of the actuator does not converges (that is, oscillates) or a time to convergence is significantly long.

In contrast, the voltage control section 15 detects that each of the electrostatic actuators 56A and 56B is oscillated by alternately detecting the absolute value of the deviation exceeding the threshold and the absolute value of the deviation below the sheet several times as the absolute value of deviation between the detection value of the gap detector 151 and the setting value after a predetermined time $T_0$ elapses. That is, even if the stabilization time elapses, the drive amount variation does not converge and the error of the vibration type can be detected as the error of the feedback control. Thus, it is possible to adjust the gain of the feedback control section 152 and it is possible to converge on the drive amount.

In the embodiment, the actuator is configured of the first electrostatic actuator 56A and the second electrostatic actuator 56B, the bias voltage is applied to the first electrostatic actuator 56A, and the feedback voltage is applied to the second electrostatic actuator 56B. Such an actuator performs the coarsely moving drive in the first electrostatic actuator 56A by applying the bias voltage. Meanwhile, the feedback voltage is controlled based on the detection value (drive amount) of the gap detector 151 and the finely moving drive is performed in the second electrostatic actuator 56B, and thereby it is possible to accurately control the drive amount of the actuator.

Here, if the bias voltage is greater than or smaller than the appropriate value, the absolute value of the deviation between the drive amount by the coarsely moving drive of the first electrostatic actuator 56A and the setting value may exceed the threshold of a range capable of corresponding to the adjustment range by the finely moving drive of the second electrostatic actuator 56B. That is, if the bias voltage is excessively great or excessively small, even if the drive amount variation converges on the minimum value or the maximum value of the feedback voltage, the detection value of the gap detector 151 may be stabilized at a value greater than the upper limit of allowable range L or at a value smaller than the lower limit.

In contrast, if the detection value converges on the outside of the range of allowable range L, that is, it is possible to detect that the error of the steady-state deviation type (see FIGS. 6A and 6B) is generated and the difference between the drive amount by the coarsely moving drive and the setting value is in a state of exceeding a range capable of adjusting the finely moving drive. Then, the bias command unit 162 adjusts the bias voltage (drive parameter) depending on the detection result. Thus, the drive amount of the coarsely moving drive can converge on the range capable of adjusting the finely moving drive and the drive amount of the actuator can be further reliably and accurately controlled.

When the absolute value of the deviation exceeding the threshold and the absolute value of the deviation less than the threshold as the absolute value of the deviation between the detection value of the gap detector 151 and the setting value are alternately detected several times after elapse of the predetermined time $T_0$ from drive start, the state detection unit 164 decreases the gain of the feedback control section 152 and controls the feedback voltage. That is, in the second electrostatic actuator 56B, since the gain of the feedback control is increased, even if it reaches the stabilization time, the detection value of the gap detector 151 vibrates without convergence and the error of the vibration type (see FIGS. 7A and 7B) is detected. Then, the gain of the feedback control is decreased by the feedback control section 152 based on the detection result and the feedback voltage is controlled, and thereby it is possible to converge the drive amount and to further reliably and accurately control the drive amount of the actuator.

The state detection unit 164 performs error detection after the predetermined time $T_0$ elapses set in the stabilization time or more described above. Thus, it is possible to detect the error by mistake by performing the error detection by the state detection unit 164 before being stabilized.

Moreover, it is preferable that a length of the predetermined time $T_0$ be the stabilization time or more and is not specifically limited as long as the predetermined time $T_0$ is the stabilization time or more, but if the predetermined time $T_0$ is excessively long with respect to the stabilization time, since a standby time to the detection timing of the error is long, there is a concern that the measurement time is long. If the stabilization time is set to the length in which the stabilization is reliably performed in a case where the appropriate feedback control is performed, it is possible to decrease the measurement time by setting the stabilization time to the predetermined time $T_0$.

If it is detected that the dimension of the gap G1 is stabilized by the state detection unit 164 before the predetermined time $T_0$ elapses from the drive start, the spectroscopic measurement apparatus 1 performs the spectroscopic measurement even before the predetermined time $T_0$ that is set in advance elapses. Thus, it is possible to suppress that a standby time of the spectroscopic measurement apparatus 1 that does not start the measurement regardless of the stabilization occurs and it is possible to decrease the measurement time.

Other Embodiments

Moreover, the invention is not limited to the embodiments and variation, improvement, and the like are intended to be included in the scope of the invention in a range in which the object of the invention can be achieved.

For example, as the actuator, an electrostatic actuator that changes the dimension of the gap G1 in the variable wavelength interference filters 5 is exemplified, but the invention is not so limited. For example, a feedback loop using another actuator such as a piezoelectric actuator and a dielectric coil actuator as the actuator may be the object. Specifically, in a case of an actuator in which the drive amount is non-linearly varied with respect to the detection voltage, if the optimal gain is not set in the feedback control by the change in the drive characteristics, as described above, there is a concern that normal drive is hindered such as abnormal oscillation. The above is effective in an actuator in which the drive characteristics are non-linearly varied and can perform the feedback control in which the optimal control state is maintained by setting the optimal gain.

In the embodiments described above, the reflective films 54 and 55 are utilized as the electrodes for capacitance detection, but the configuration is not limited to the embodiment. For example, electrodes for capacitance detection facing each other may be printed in the fixed substrate 51 and the movable substrate 52 separately from the reflective films 54 and 55.

Furthermore, the detection unit of the drive amount is not limited to the configuration using the electrostatic capacitance detection electrode described above and, for example, may be configured to detect the gap amount of the gap G1 between the reflective films by detecting a curved state of the movable substrate 52 (the holding section 522) by a strain gauge and the like or may be configured to provide an optical sensor for detecting the gap amount on the outside.

In the embodiment described above, an example in which the first electrostatic actuator 56A to which the bias voltage is applied is disposed on the outer periphery side of the second electrostatic actuator 56B to which the feedback voltage is applied is illustrated, but the invention is not limited to the embodiment. For example, a configuration may be provided in which the first electrostatic actuator 56A is provided on an inner periphery side of the second electrostatic actuator 56B and the second electrostatic actuator 56B is provided on the outer periphery side of the first electrostatic actuator 56A on the outer periphery side of the reflective films 54 and 55.

In the embodiment described above, a configuration in which as a plurality of actuators, the first electrostatic actuator 56A and the second electrostatic actuator 56B are included, and the bias voltage is applied to the first electrostatic actuator 56A and the feedback voltage is applied to the second electrostatic actuator 56B is exemplified, but the invention is not limited to the embodiment, and a configuration in which one actuator is included may be provided. In this case, for example, the actuator corresponding to the first electrostatic actuator 56A to which one bias voltage is applied is not provided and only one actuator corresponding to the second electrostatic actuator 56B is provided, and thereby the gain of the feedback control is adjusted depending on the detection value of the drive amount.

In the embodiment described above, a configuration in which the subtraction circuit 154 is provided and the deviation between the detection value of the gap detector 151 is obtained is exemplified, but the invention is not limited to the embodiment, and the subtraction circuit 154 may not be provided. For example, when performing the feedback control in the feedback driving section 152, a configuration in which the obtained deviation is used is exemplified.

In the embodiment described above, a configuration in which the analog circuit that is the subtraction circuit 154, the absolute value circuit 155, and the comparator 156 is included, but the invention is not limited to the embodiment. For example, the deviation between the detection value of the gap detector 151 is obtained and detection of the stabilization or detection of the error is performed by the microcomputer 16 based on the deviation without including the analog circuit.

Furthermore, as the electronic apparatus in embodiment described above, the spectroscopic measurement apparatus 1 is exemplified, but in addition, it is possible to apply the driving method of the variable wavelength interference filter, the optical module, and the electronic apparatus to various fields.

Figure 8:
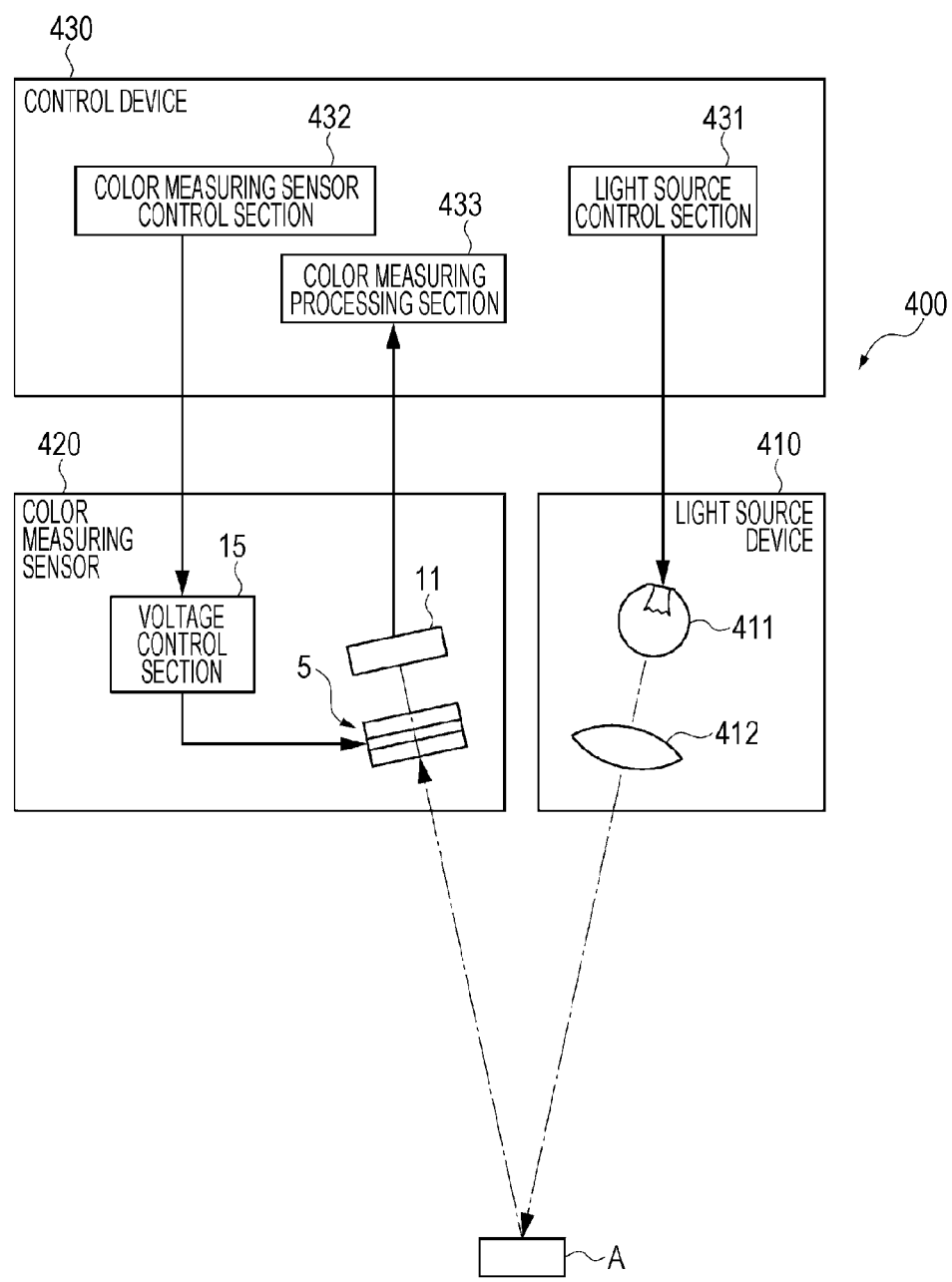
FIG. 8 is a schematic diagram illustrating a color measuring apparatus that is an example of an electronic apparatus.

For example, as illustrated in FIG. 8, the electronic apparatus can be applied to a color measuring apparatus for measuring color.

FIG. 8 is a block diagram illustrating a color measuring apparatus 400 including a variable wavelength interference filter.

As illustrated in FIG. 8, a color measuring apparatus 400 includes a light source device 410 emitting light to an inspection object A, a color measuring sensor 420 (optical module), and a control device 430 (processing section) that controls an entire operation of the color measuring apparatus 400. Then, the color measuring apparatus 400 is a device that reflects light reflected from the light source device 410 on the inspection object A, receives the reflected inspection object light in the color measuring sensor 420, analyzes, and measures chromaticity of the inspection object light, that is, the color of the inspection object A based on the detection signal output from the color measuring sensor 420.

The light source device 410 includes a light source 411 and a plurality of lenses 412 (only one is described in FIG. 8), and emits a reference light (for example, white light) with respect to the inspection object A. Furthermore, the plurality of lenses 412 may include a collimator lens and, in this case, the light source device 410 makes the reference light emitted from the light source 411 be a parallel light by the collimator lens and emits the parallel light from a projection lens (not illustrated) to the inspection object A. Moreover, in the embodiment, the color measuring apparatus 400 including the light source device 410 is exemplified, but, for example, if the inspection object A is a light emitting member such as a liquid crystal panel, the light source device 410 may not be provided.

As illustrated in FIG. 8, the color measuring sensor 420 includes a variable wavelength interference filter 5, a detector 11 that receives the light transmitting the variable wavelength interference filter 5, and a voltage control section 15 that changes the wavelength of the light transmitting the variable wavelength interference filter 5. Furthermore, the color measuring sensor 420 includes an incident optical lens (not illustrated) that guides the reflected light (the inspection object light) reflected from the inspection object A to the inside in a position facing the variable wavelength interference filter 5. Then, the color measuring sensor 420 spectrally disperses the light of a predetermined wavelength of the inspection object light incident from the incident optical lens and receives the spectroscopic light in the detector 11 by the variable wavelength interference filter 5.

The control device 430 controls an entire operation of the color measuring apparatus 400.

As the control device 430, for example, a general-purpose personal computer, a portable information terminal, a dedicated color measuring computer, or the like may be used. Then, as illustrated in FIG. 8, the control device 430 is configured to include a light source control section 431, a color measuring sensor control section 432, a color measuring processing section 433, and the like.

The light source control section 431 is connected to the light source device 410, outputs a predetermined control signal to the light source device 410 for example, based on a setting input of a user, and emits white light of predetermined brightness.

The color measuring sensor control section 432 is connected to the color measuring sensor 420 and sets the wavelength of the light received by the color measuring sensor 420 for example, based on the setting input of the user, and outputs the control signal of indicating that a received light amount of the wavelength is detected to the color measuring sensor 420. Thus, the voltage control section 15 of the color measuring sensor 420 applies the voltage to the electrostatic actuator 56 based on the control signal and drives the variable wavelength interference filter 5.

The color measuring processing section 433 analyzes chromaticity of the inspection object A from the received light amount detected by the detector 11.

Furthermore, as another example of the electronic apparatus, a light-based system for detecting a presence of a specific substance is included. As such a system, for example, a gas leak detector mounted on a vehicle for high sensitively detecting a specific gas or a gas detection apparatus such as a photoacoustic noble gas for breath test by employing a spectroscopic measurement method using the variable wavelength interference filter can be exemplified.

An example of such a gas detection apparatus will be described below with reference to the drawings.

Figure 9:
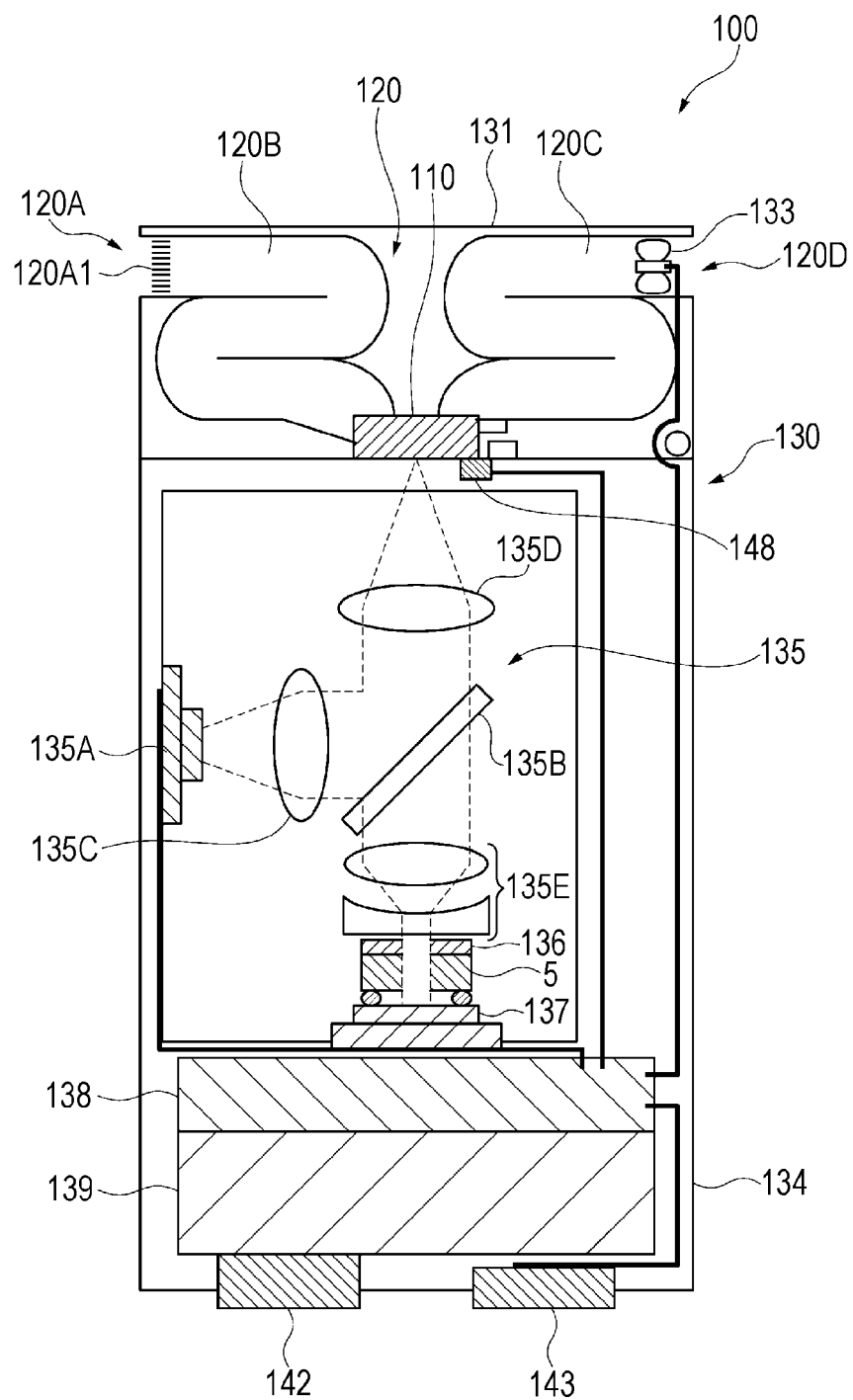
FIG. 9 is a schematic diagram illustrating a gas detecting apparatus that is an example of an electronic apparatus.

FIG. 9 is a schematic view illustrating a gas detection apparatus that is an example of an electronic apparatus.

Figure 10:
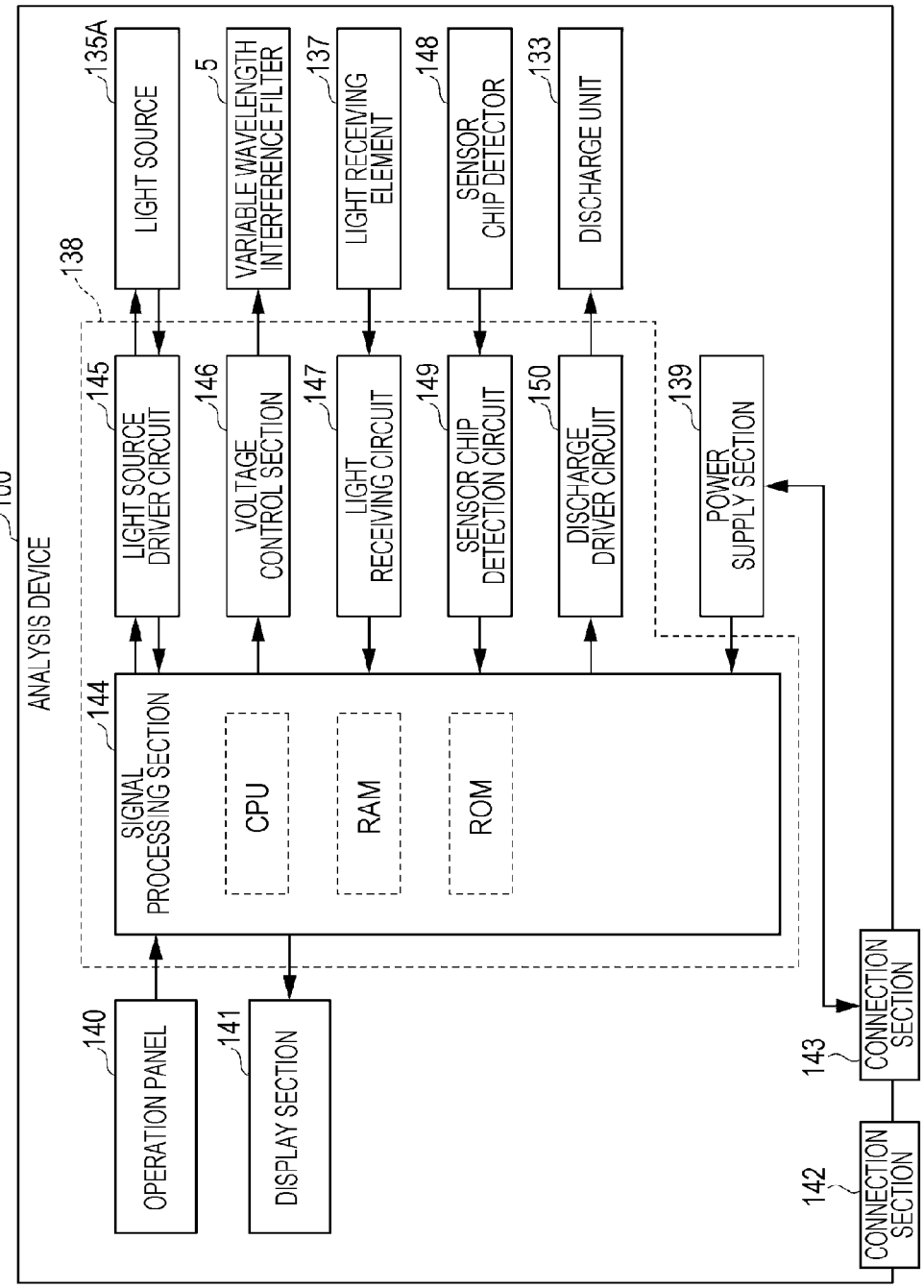
FIG. 10 is a block diagram illustrating a configuration of a control system of the gas detecting apparatus of FIG. 9.

FIG. 10 is a block diagram illustrating a configuration of a control system of the gas detecting apparatus of FIG. 9.

As illustrated in FIG. 9, a gas detecting apparatus 100 is configured to include a flow passage 120 that has a sensor chip 110, an intake port 120A, an intake flow passage 120B, a discharge flow passage 120C, and a discharge port 120D, and a body section 130.

The body section 130 is configured of a detection device (optical module) that includes a sensor section cover 131 having an opening capable of attaching and detaching the flow passage 120, a discharge unit 133, a housing 134, an optical section 135, a filter 136, a variable wavelength interference filter 5, a light receiving element 137 (detection section), and the like, a control section 138 (processing section) that processes a detected signal and controls the detection section, a power supply section 139 that supplies power, and the like. Furthermore, the optical section 135 is configured of a light source 135A that emits light, a beam splitter 135B that reflects the light incident from the light source 135A to the sensor chip 110 side and transmits the light incident from the sensor chip side to the light receiving element 137, and lenses 135C, 135D, and 135E.

Furthermore, as illustrated in FIG. 10, an operation panel 140, a display section 141, a connection section 142 for the interface with the outside, and the power supply section 139 are provided on a surface of the gas detecting apparatus 100. If the power supply section 139 is a secondary battery, a connection section 143 for charging may not be included.

Furthermore, as illustrated in FIG. 10, the control section 138 of the gas detecting apparatus 100 includes a signal processing section 144 that is configured of a CPU and the like, a light source driver circuit 145 that controls the light source 135A, a voltage control section 146 that controls the variable wavelength interference filter 5, a light receiving circuit 147 that receives a signal from the light receiving element 137, a sensor chip detection circuit 149 that reads a code of the sensor chip 110 and receives the signal from a sensor chip detector 148 detecting presence or absence of the sensor chip 110, and a discharge driver circuit 150 that controls the discharge unit 133.

Next, an operation of the gas detecting apparatus 100 described above will be described below.

The sensor chip detector 148 is provided inside the sensor section cover 131 on the upper portion of the body section 130 and the sensor chip detector 148 detects presence or absence of the sensor chip 110. When detecting the detection signal from the sensor chip detector 148, the signal processing section 144 determines that the sensor chip 110 is in a mounted state and outputs a display signal displaying indicating that a detection operation is capable of performing to the display section 141.

Thus, for example, if the operation panel 140 is operated by a user and an instruction signal of indicating that a detection process is started is output from the operation panel 140, first, the signal processing section 144 outputs a signal of a light source operation to the light source diver circuit 145 and operates the light source 135A. If the light source 135A is driven, stable laser beam of linearly polarized light having a single wavelength is emitted from the light source 135A. Furthermore, a temperature sensor or light amount sensor are built in the light source 135A and information thereof is output to the signal processing section 144. Then, if it is determined that the light source 135A is stably operated based on the temperature or the light amount input from the light source 135A, the signal processing section 144 controls the discharge driver circuit 150 and operates the discharge unit 133. Thus, a gas sample containing a target material (gas molecule) to be detected is guided from the intake port 120A to the intake flow passage 120B, inside the sensor chip 110, the discharge flow passage 120C, and the discharge port 120D. Moreover, the intake port 120A is provided with a dust filter 120A1 and removes relatively large dust or some of water vapor, and the like.

Furthermore, the sensor chip 110 is a sensor in which a plurality of metal nanostructures are embedded and which uses localized surface plasmon resonance. In such a sensor chip 110, if an enhanced electric field is formed between the metal nanostructures by the laser beam and the gas molecule enters within the enhanced electric field, a Raman scattering light and Rayleigh scattering light containing information of molecular vibration are generated.

The Raman scattering light or Rayleigh scattering light is incident on the filter 136 through the optical section 135, the Rayleigh scattering light is separated by the filter 136, and the Raman scattering light is incident on the variable wavelength interference filter 5. Then, the signal processing section 144 outputs the control signal to the voltage control section 146. Thus, as illustrated in the embodiment described above, the voltage control section 146 is configured of a gap detector 151, a feedback driving section 152, and a microcomputer 16, drives the variable wavelength interference filter 5 by the same driving method as that of the embodiment, and spectrally disperses the Raman scattering light corresponding to the gas molecule that is the detection object by the variable wavelength interference filter 5.

Thereafter, when receiving the spectroscopic light in the light receiving element 137, a light receiving signal depending on the received light amount is output to the signal processing section 144 through the light receiving circuit 147. In this case, it is possible to accurately take out the Raman scattering light that is the object from the variable wavelength interference filter 5.

The signal processing section 144 compares spectral data of the Raman scattering light corresponding to the gas molecule to be detected obtained as described above and data stored in a ROM, determines whether or not the gas molecule is the target gas molecule, and makes the gas molecule be a specific substance. Furthermore, the signal processing section 144 displays result information on the display section 141 or outputs the information from the connection section 142 to the outside.

In addition, in FIGS. 9 and 10, the gas detecting apparatus 100 that spectrally disperses the Raman scattering light by the variable wavelength interference filter 5 and performs the gas detection from the spectral Raman scattering light is exemplified, but as the gas detecting apparatus, a gas detecting apparatus for identifying a type of gas by detecting gas-specified absorption may be used. In this case, a gas sensor that makes gas enter inside the sensor and detects light of the incident light, which is absorbed in the gas is used as an optical module. Then, the gas detecting apparatus that analyzes and determines the gas entering inside the sensor by the gas sensor is an electronic apparatus. It is possible to detect components of the gas by using the variable wavelength interference filter even in such a configuration.

Furthermore, as the system for detecting the presence of a specific substance, the system is not limited to the gap detection described above and a substance component analysis apparatus such as a non-invasive measuring apparatus of sugars by near infrared spectroscopy or a non-invasive measurement apparatus of information of food or living body, minerals, and the like can be exemplified.

Hereinafter, as an example of the substance component analysis apparatus, a food analysis apparatus is described.

Figure 11:
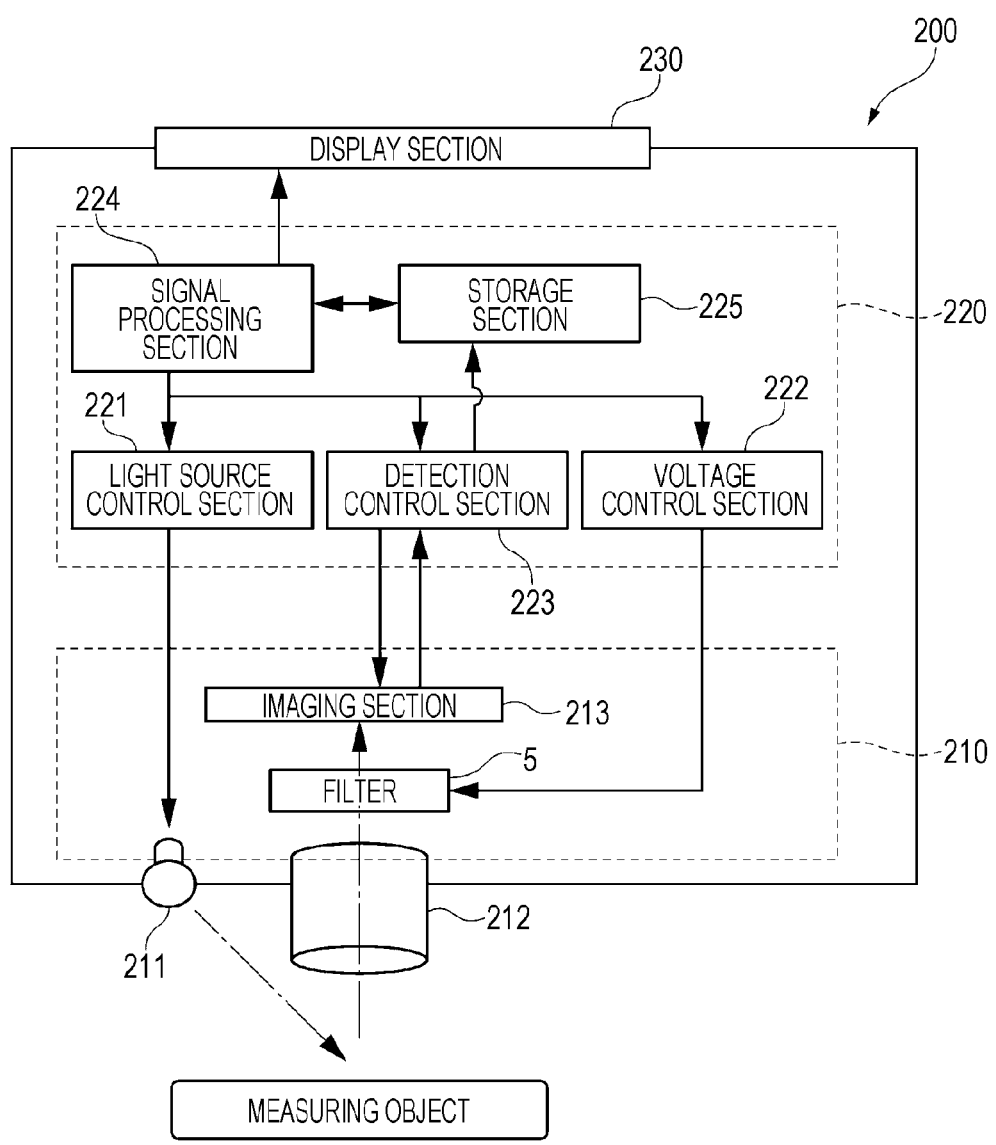
FIG. 11 is a diagram illustrating a schematic configuration of a food analysis apparatus that is an example of an electronic apparatus.

FIG. 11 is a diagram illustrating a schematic configuration of a food analysis apparatus that is an example of the electronic apparatus using a variable wavelength interference filter 5.

As illustrated in FIG. 11, a food analysis apparatus 200 includes a detector 210 (optical module), a control section 220, and a display section 230. The detector 210 includes a light source 211 that emits light, an imaging lens 212 that introduces the light from a measurement object, a variable wavelength interference filter 5 that spectrally disperses the light introduced from the imaging lens 212, and an imaging section 213 (detection section) that detects the spectroscopic light.

Furthermore, the control section 220 includes a light source control section 221 that performs control of control of lighting and lighting off of the light source 211 and brightness when lighting, a voltage control section 222 that controls the variable wavelength interference filter 5, a detection control section 223 that controls the imaging section 213 and obtains spectroscopic image photographed in the imaging section 213, a signal processing section 224 (analyzing section) and a storage section 225.

In the food analysis apparatus 200, when the system is driven, the light source 211 is controlled by the light source control section 221 and the light is irradiated from the light source 211 to a measurement object. Then, the light reflected from the measurement object is incident on the variable wavelength interference filter 5 through the imaging lens 212. The variable wavelength interference filter 5 is driven by the control of the voltage control section 222 with the driving method as illustrated in the embodiment described above. Thus, it is possible to accurately take out the light of the target wavelength from the variable wavelength interference filter 5. Then, the take-out light is, for example, photographed by the imaging section 213 configured of a CCD camera and the like. Furthermore, the imaged light is accumulated in the storage section 225 as the spectroscopic image. Furthermore, the signal processing section 224 controls the voltage control section 222, changes a voltage value applied to the variable wavelength interference filter 5, and obtains the spectroscopic image for each wavelength.

Then, the signal processing section 224 calculates data of each pixel in each image accumulated in the storage section 225 and obtains a spectrum in each pixel. Furthermore, the storage section 225 stores information about food ingredient with respect to the spectrum. The signal processing section 224 analyzes data of the obtained spectrum based on the information about the food stored in the storage section 225 and obtains the food ingredient and its content amount contained in a detection object. Furthermore, it is also possible to calculate calories and freshness of the food from the obtained food ingredient and content amount. Furthermore, it is possible to perform extraction and the like of a portion in which freshness of the food of the inspection object is lowered by analyzing spectrum distribution in the image.

Then, the signal processing section 224 performs a process to display information of the food ingredient or content amount, calories, or freshness and the like of the food that is the inspection object obtained as described above of the display section 230.

Furthermore, in FIG. 11, the food analysis apparatus 200 is exemplified, but can be also used as a non-invasive measurement apparatus of other information as described above by substantially the same configuration. For example, it is possible to be used as a biological analysis apparatus that analyzes a biological component such as measurement, analysis, and the like of body fluid component such as blood. For example, such a biological analysis apparatus can be used as a drunken driving prevention apparatus for detecting an intoxication level of a driver if the apparatus is an apparatus for detecting ethyl alcohol as an apparatus measuring a body fluid component such as the blood. Furthermore, it is also possible to be used as an electronic endoscope system including such a biological analysis apparatus.

Furthermore, it is also possible to be used as a mineral analysis apparatus for performing component analysis of the minerals.

Furthermore, the variable wavelength interference filter, the optical module, and the electronic apparatus can be applied to the following apparatuses.

For example, data can be transmitted by the light of each wavelength by changing this case, the light of specific wavelength is spectrally dispersed by the variable wavelength interference filter provided in the optical module and the light receiving section receives the light, and thereby it is possible to extract the data transmitted by the light of the specific wavelength. The data of each wavelength is printed by the electronic apparatus including such an optical module for extracting the data and thereby it is also possible to perform optical communication.

Furthermore, the electronic apparatus can be applied to a spectroscopic camera photographing the spectroscopic image, a spectroscopic analyzer, and the like by spectrally dispersing the light by the variable wavelength interference filter. As an example of the spectroscopic camera, an infrared camera equipped with the variable wavelength interference filter is included.

Figure 12:
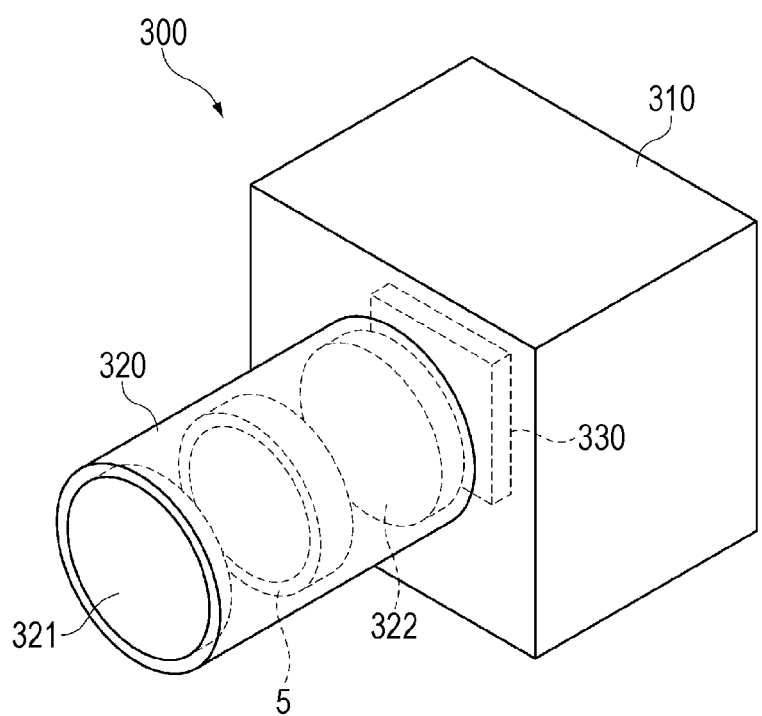
FIG. 12 is a view illustrating a schematic configuration of a spectroscopic camera that is an example of an electronic apparatus.

FIG. 12 is a view illustrating a schematic configuration of the spectroscopic camera. As illustrated in FIG. 12, a spectroscopic camera 300 includes a camera body 310, an imaging lens unit 320, and an imaging section 330 (detection section).

The camera body 310 is a portion that is held and operated by a user.

The imaging lens unit 320 is provided in the camera body 310 and guides an incident image light to the imaging section 330. Furthermore, as illustrated in FIG. 12, the imaging lens unit 320 is configured to include an objective lens 321, an imaging lens 322, and a variable wavelength interference filter 5 provided between the lenses.

The imaging section 330 is configured of a light emitting element and photographs the image light guided by the imaging lens unit 320.

In such a spectroscopic camera 300, the light of a wavelength that is the imaging object is transmitted by the variable wavelength interference filter 5 and thereby it is possible to photograph the spectroscopic image of the light of a predetermined wavelength. At this time, a voltage control section (not illustrated) drives the variable wavelength interference filter 5 by the driving method illustrated in the embodiment described above for each wavelength and thereby it is possible to accurately take out the image light of the spectroscopic image of the target wavelength.

Furthermore, the variable wavelength interference filter may be used as a band pulse filter and, for example, can be used as an optical laser apparatus that spectrally disperses and transmits only the light of a narrow band centered on a predetermined wavelength of the light of a predetermined wavelength range that is emitted by the light emitting element.

Furthermore, the variable wavelength interference filter may be used as a biometric authentication apparatus and, for example, can be applied to an authentication apparatus of a blood vessel or a fingerprint, retina, iris, and the like using the light of a near infrared region or a visible region.

Furthermore, the optical module and the electronic apparatus can be used as a concentration detection apparatus. In this case, infrared energy (infrared light) emitted from a substance is spectrally dispersed and analyzed by the variable wavelength interference filter and measures a concentration of an analyte in a sample.

As described above, the variable wavelength interference filter, the optical module, and the electronic apparatus can be applied to any apparatus that spectrally disperses a predetermined light from the incident light. Then, as described above, since the variable wavelength interference filter can spectrally disperse a plurality of wavelengths in one device, it is possible to accurately perform the measurement of the spectrum of the plurality of wavelengths and inspection with respect to a plurality of components. Thus, it is possible to facilitate reduction of the size of the optical module or the electronic apparatus compared to an apparatus of the related art in which a desired wavelength is taken out by a plurality of devices and, for example, it is possible to be appropriately used as a portable or vehicle optical device.

Furthermore, in the embodiments described above, examples in which the drive characteristics are obtained from the gap dimension of each of the electrostatic actuators 56A and 56B provided between the substrates and the gain is set in the feedback control of each of the electrostatic actuators 56A and 56B are described, but the invention is not limited to the examples.

For example, feedback control of an actuator driving apparatus in which a drive amount is nonlinearly changed with respect to a drive voltage by applying a voltage can be used. For example, as such an actuator, a piezo actuator is included. Specifically, it is also possible to apply to a mirror device or the like for changing a posture of a mirror only by an angle depending on a drive voltage by applying the drive voltage to the piezo actuator. In this case, a configuration and the like in which drive characteristics of the piezo actuator is obtained by detecting a drive amount (driving angle and the like) of the piezo actuator when applying a predetermined drive voltage and the feedback control of the drive of the piezo actuator is performed based on the obtained drive characteristics is included.

In addition, the specific structure when implementing the embodiments of the invention can be appropriately changed to other structures in a range that can achieve the object of the invention.

The entire disclosure of Japanese Patent Application No. 2014-012123 filed on Jan. 27, 2014 is expressly incorporated by reference herein.

What is claimed is:

1. An actuator control device comprising:
   an actuator that is driven by applying a drive voltage;
   a detector configured to detect a drive amount of the actuator; and
   a voltage control section configured to control the drive voltage applied to the actuator according to:

a detection value of the drive amount detected by the detector; and a setting value of the drive amount, wherein the voltage control section includes a deviation detector configured to detect whether an absolute value of a deviation between the detection value and the setting value exceeds a predetermined threshold after a predetermined time elapses from a time the drive voltage is applied to the actuator.

2. The actuator control device according to claim 1, further comprising:

a parameter corrector configured to correct a drive parameter of the actuator in the voltage control section if the absolute value of the deviation is determined to exceed the threshold.

3. The actuator control device according to claim 2, wherein the parameter corrector decreases a gain in the voltage control section if, during a pre-selected period of time, the absolute value of the deviation is repeatedly detected as alternately being:

equal to the threshold or less; and exceeding the threshold.

4. The actuator control device according to claim 2, wherein the actuator includes a first actuator and a second actuator that are configured to be driven independently from each other, wherein the voltage control section includes a bias voltage applicator configured to apply a predetermined bias voltage to the first actuator and a controller configured to control the drive voltage applied to the second actuator based on the drive amount detected by the detector and a target value of the drive amount of the actuator, and wherein the parameter corrector changes the bias voltage in the bias voltage applicator if, during a pre-selected period of time, the absolute value of the deviation is continuously detected as being equal to or greater than the threshold.

5. An optical module comprising:

a pair of reflective films facing each other;

an actuator that is driven by applying a drive voltage and changes a gap dimension between the pair of reflective films depending on a drive amount;

a detector configured to detect the drive amount of the actuator; and a voltage control section configured to control a drive voltage applied to the actuator depending on a detection value of the drive amount detected by the detector and a setting value of the drive amount, wherein the voltage control section includes a deviation detector configured to detect whether an absolute value of a deviation between the detection value and the setting value exceeds a predetermined threshold after a predetermined time elapses from a time the drive voltage is applied to the actuator.

6. The optical module according to claim 5, further comprising:

a parameter corrector configured to correct a drive parameter of the actuator in the voltage control section if the absolute value of the deviation is determined to exceed the threshold.

7. The optical module according to claim 6, wherein the parameter corrector decreases a gain in the voltage control section if, during a pre-selected period of time, the absolute value of the deviation is repeatedly detected as alternately being:

equal to the threshold or less; and exceeding the threshold.

8. The optical module according to claim 6, wherein the actuator includes a first actuator and a second actuator that are configured to be driven independently from each other, wherein the voltage control section includes a bias voltage applicator configured to apply a predetermined bias voltage to the first actuator and a controller configured to control the drive voltage applied to the second actuator based on the drive amount detected by the detector and a target value of the drive amount of the actuator, and wherein the parameter corrector changes the bias voltage in the bias voltage applicator if, during a pre-selected period of time, the absolute value of the deviation is continuously detected as being equal to or greater than the threshold.

9. An electronic apparatus comprising:

an actuator that is driven by applying a drive voltage;

a detector configured to detect a drive amount of the actuator;

a voltage control section configured to control the drive voltage applied to the actuator depending on a detection value of the drive amount detected by the detector and a setting value of the drive amount; and a processing section configured to perform a predetermined process by driving the actuator, wherein the voltage control section includes a deviation detector configured to detect whether an absolute value of a deviation between the detection value and the setting value exceeds a predetermined threshold after a predetermined time elapses from a time the drive voltage is applied to the actuator.

10. The electronic apparatus according to claim 9, further comprising:

a parameter corrector configured to correct a drive parameter of the actuator in the voltage control section if the absolute value of the deviation is determined to exceed the threshold.

11. The electronic apparatus according to claim 10, wherein the parameter corrector decreases a gain in the voltage control section if, during a pre-selected period of time, the absolute value of the deviation is repeatedly detected as alternately being:

equal to the threshold or less; and exceeding the threshold.

12. The electronic apparatus according to claim 10, wherein the actuator includes a first actuator and a second actuator that are configured to be driven independently from each other, wherein the voltage control section includes a bias voltage applicator configured to apply a predetermined bias voltage to the first actuator and a controller configured to control the drive voltage applied to the second actuator based on the drive amount detected by the detector and a target value of the drive amount of the actuator, and wherein the parameter corrector changes the bias voltage in the bias voltage applicator if, during a pre-selected period of time, the absolute value of the deviation is continuously detected as being equal to or greater than the threshold.

13. The actuator control device according to claim 1,
wherein the actuator is configured to change an air gap between first and second reflective films,
the detection value corresponds to the drive amount of the actuator based on a gap distance of the air gap,
the setting value corresponds to an ideal gap distance of the air gap when the drive voltage is applied to the actuator,
wherein the detection value has a vibration state and a stabilized state,
immediately after the drive voltage is applied, the detection value is in the vibration state, and
after the predetermined time elapses, the detection value is in the stabilized state so that the predetermined time is defined between the vibration state and the stabilized state of the detection value.

14. The optical module according to claim 5,
wherein the detection value corresponds to the drive amount of the actuator based on the gap dimension,
the setting value corresponds to an ideal gap dimension when the drive voltage is applied to the actuator,
wherein the detection value has a vibration state and a stabilized state,
immediately after the drive voltage is applied, the detection value is in the vibration state, and
after the predetermined time elapses, the detection value is in the stabilized state so that the predetermined time is defined between the vibration state and the stabilized state of the detection value.

15. The electronic apparatus according to claim 9,
wherein the actuator is configured to change an air gap between first and second reflective films,
the detection value corresponds to the drive amount of the actuator based on a gap distance of the air gap,
the setting value corresponds to an ideal gap distance of the air gap when the drive voltage is applied to the actuator,
wherein the detection value has a vibration state and a stabilized state,
immediately after the drive voltage is applied, the detection value is in the vibration state, and
after the predetermined time elapses, the detection value is in the stabilized state so that the predetermined time is defined between the vibration state and the stabilized state of the detection value.

* * * * *